United States Patent
Lieng et al.

(10) Patent No.: US 10,457,861 B2
(45) Date of Patent: *Oct. 29, 2019

(54) METHODS AND COMPOSITIONS FOR USE OF PROPPANT SURFACE CHEMISTRY AND INTERNAL POROSITY TO CONSOLIDATE PROPPANT PARTICULATES

(71) Applicant: CARBO CERAMICS, INC., Houston, TX (US)

(72) Inventors: Thu Lieng, Richmond, TX (US); Daryl Erwin Johnson, Houston, TX (US); Todd Roper, Katy, TX (US); Chad Cannan, Lancaster, NY (US)

(73) Assignee: CARBO CERAMICS, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,457

(22) Filed: Mar. 29, 2017

(65) Prior Publication Data
US 2017/0198214 A1    Jul. 13, 2017

Related U.S. Application Data

(63) Continuation of application No. 15/080,206, filed on Mar. 24, 2016.
(Continued)

(51) Int. Cl.
*C09K 8/68* (2006.01)
*C09K 8/80* (2006.01)
(Continued)

(52) U.S. Cl.
CPC .............. *C09K 8/805* (2013.01); *C09K 8/685* (2013.01); *C09K 8/887* (2013.01); *C09K 8/90* (2013.01);
(Continued)

(58) Field of Classification Search
CPC ........ E21B 43/04; E21B 43/16; E21B 43/267; E21B 43/082; E21B 43/08; E21B 43/02;
(Continued)

(56) References Cited

U.S. PATENT DOCUMENTS

| 3,498,380 A | 3/1970 | Sparlin et al. |
| 3,857,444 A | 12/1974 | Copeland |

(Continued)

FOREIGN PATENT DOCUMENTS

| EP | 0542397 A2 | 5/1993 |
| EP | 1447523 A1 | 8/2004 |

(Continued)

OTHER PUBLICATIONS

2008 Air Products and Chemicals, Inc.—AR555—Brochure.*
(Continued)

*Primary Examiner* — George S Gray
(74) *Attorney, Agent, or Firm* — Patterson + Sheridan, LLP

(57) ABSTRACT

A method of gravel packing a wellbore can include mixing an activator, a thickener, a crosslinker and a plurality of resin-coated proppant particulates to provide a gravel pack fluid and introducing the gravel pack fluid into a gravel pack region of the wellbore. At least a portion of the plurality of resin-coated proppant particulates can be consolidated in the gravel pack region of the wellbore to provide a consolidated gravel pack. The consolidated gravel pack can have a UCS of at least about 60 psi when formed under a pressure of about 0.01 psi to about 50 psi and a temperature of about 160° F. to about 250° F.

20 Claims, 4 Drawing Sheets

Related U.S. Application Data

(60) Provisional application No. 62/139,053, filed on Mar. 27, 2015.

(51) Int. Cl.
| | |
|---|---|
| *C09K 8/88* | (2006.01) |
| *E21B 43/04* | (2006.01) |
| *E21B 43/267* | (2006.01) |
| *E21B 43/26* | (2006.01) |
| *C09K 8/90* | (2006.01) |
| *E21B 43/08* | (2006.01) |
| *E21B 37/06* | (2006.01) |

(52) U.S. Cl.
CPC ............. *E21B 43/04* (2013.01); *E21B 43/08* (2013.01); *E21B 43/26* (2013.01); *E21B 43/267* (2013.01); *C09K 2208/24* (2013.01); *C09K 2208/26* (2013.01); *E21B 37/06* (2013.01)

(58) Field of Classification Search
CPC .......... C09K 8/805; C09K 8/68; C09K 8/885; C09K 8/5755; C09K 8/5086; C09K 8/6858; C09K 8/88; C09K 8/887; C09K 8/90
USPC .......................................................... 507/200
See application file for complete search history.

(56) References Cited

U.S. PATENT DOCUMENTS

| | | | |
|---|---|---|---|
| 3,935,339 | A | 1/1976 | Cooke, Jr. |
| 4,487,259 | A | 12/1984 | McMichael et al. |
| 4,518,039 | A | 5/1985 | Graham et al. |
| 4,527,627 | A | 7/1985 | Graham et al. |
| 4,785,884 | A | 11/1988 | Armbruster |
| 4,923,714 | A | 5/1990 | Gibb et al. |
| 5,218,038 | A | 6/1993 | Johnson et al. |
| 5,293,935 | A | 3/1994 | Arterbury et al. |
| 5,316,792 | A | 5/1994 | Harry et al. |
| 5,422,183 | A | 6/1995 | Sinclair et al. |
| 5,508,325 | A | 4/1996 | Craun et al. |
| 5,551,513 | A | 9/1996 | Surles et al. |
| 5,837,656 | A | 11/1998 | Sinclair et al. |
| 5,948,734 | A | 9/1999 | Sinclair et al. |
| 5,955,144 | A | 9/1999 | Sinclair et al. |
| 6,209,643 | B1 | 4/2001 | Nguyen et al. |
| 6,311,773 | B1 | 11/2001 | Todd et al. |
| 6,528,157 | B1 | 3/2003 | Hussain et al. |
| 6,586,089 | B2 | 7/2003 | Golden |
| 6,632,527 | B1 | 10/2003 | McDaniel et al. |
| 8,097,119 | B2 | 1/2012 | Eagle et al. |
| 8,183,186 | B2 * | 5/2012 | Luo ................. C04B 18/021 166/280.2 |
| 8,499,827 | B2 | 8/2013 | Dusterhoft et al. |
| 2002/0048676 | A1 | 4/2002 | McDaniel et al. |
| 2003/0131998 | A1 | 7/2003 | Nguyen et al. |
| 2005/0006093 | A1 | 1/2005 | Nguyen |
| 2005/0019574 | A1 | 1/2005 | McCrary |
| 2007/0089881 | A1 | 4/2007 | Hutchins et al. |
| 2007/0173417 | A1 * | 7/2007 | Kaufman ............... C09K 8/524 507/269 |
| 2007/0173553 | A1 | 7/2007 | Taylor, Jr. |
| 2008/0230223 | A1 | 9/2008 | McCrary et al. |
| 2008/0283243 | A1 | 11/2008 | Rediger et al. |
| 2010/0048430 | A1 * | 2/2010 | Funkhouser ........... C09K 8/685 507/219 |
| 2010/0065271 | A1 | 3/2010 | McCrary et al. |
| 2011/0024129 | A1 | 2/2011 | Turakhia et al. |
| 2011/0284225 | A1 * | 11/2011 | Lord ..................... C09K 8/90 166/305.1 |
| 2011/0284245 | A1 | 11/2011 | Crandall et al. |
| 2013/0261032 | A1 | 10/2013 | Ladva et al. |
| 2013/0295319 | A1 | 11/2013 | Yeager et al. |
| 2014/0178325 | A1 * | 6/2014 | Martinez-Castro ...... C09D 7/02 424/70.16 |
| 2014/0318775 | A1 * | 10/2014 | Cannan ................. C09K 8/805 166/276 |
| 2014/0332214 | A1 | 11/2014 | Zhou et al. |
| 2014/0357535 | A1 * | 12/2014 | Tang .................... C09K 8/805 507/219 |

FOREIGN PATENT DOCUMENTS

| | | |
|---|---|---|
| GB | 2099041 A | 12/1982 |
| WO | 2007104911 A1 | 9/2007 |

OTHER PUBLICATIONS

International Search Report and Written Opinion for International Application No. PCT/US16/24048 dated Aug. 26, 2016.
European Search Report in application EP 14787944 dated Nov. 30, 2016.
Extended European Search Report dated Aug. 31, 2018 for Application No. 16773803.8.

* cited by examiner

METHODS AND COMPOSITIONS FOR USE OF PROPPANT SURFACE CHEMISTRY AND INTERNAL POROSITY TO CONSOLIDATE PROPPANT PARTICULATES

CROSS-REFERENCE TO RELATED APPLICATIONS

This application is a continuation of U.S. application Ser. No. 15/080,206 filed Mar. 24, 2016, which claims priority to U.S. Provisional Application No. 62/139,053, filed Mar. 27, 2015. The above-mentioned applications are hereby incorporated by reference.

FIELD

The present invention relates to methods for hydraulically fracturing a subterranean formation to improve the hydrocarbon production rates and ultimate recovery by contacting unconsolidated resin-coated proppant particulates with an activator to form a consolidated proppant pack. The present invention also relates to methods for use in water injection wells to consolidate the proppant particulates in a gravel packed or frac packed region of a wellbore.

BACKGROUND

In order to stimulate and more effectively produce hydrocarbons from oil and gas bearing formations, and especially formations with low porosity and/or low permeability, induced fracturing (called "frac operations", "hydraulic fracturing", or simply "fracing") of the hydrocarbon-bearing formations has been a commonly used technique. In a typical hydraulic fracturing operation, fluid slurries are pumped downhole under high pressure, causing the formations to fracture around the borehole, creating high permeability conduits that promote the flow of the hydrocarbons into the borehole. These frac operations can be conducted in horizontal and deviated, as well as vertical, boreholes, and in either intervals of uncased wells, or in cased wells through perforations.

In cased boreholes in vertical wells, for example, the high pressure fracturing fluids exit the borehole via perforations through the casing and surrounding cement, and cause the formations to fracture, usually in thin, generally vertical sheet-like fractures in the deeper formations in which oil and gas are commonly found. These induced fractures generally extend laterally a considerable distance out from the wellbore into the surrounding formations, and extend vertically until the fractures reach a formation that is not easily fractured above and/or below the desired frac interval. The directions of maximum and minimum horizontal stress within the formation determine the azimuthal orientation of the induced fractures.

The high pressure fracturing fluids contain particulate materials called proppants. The proppants are generally composed of sand, resin-coated sand or ceramic particulates, and the fluid used to pump these proppant particulates downhole is usually designed to be sufficiently viscous such that the proppant particulates remain entrained in the fluid as it moves downhole and out into the induced fractures. After the proppant has been placed in the fracture and the fluid pressure relaxed, the fracture is prevented from completely closing by the presence of the proppants which thus provide a high conductivity flow path to the wellbore which results in improved production performance from the stimulated well.

Sometimes, a wellbore will need to be "gravel packed" before production from the well begins in order to prevent particles (typically referred to as formation fines) from entering the wellbore. Gravel packing is necessary in formations that contain individual sand grains that are not tightly cemented together. If the individual sand grains remain unconsolidated, when production of the formation begins, the force of fluid flow will tend to move the unconsolidated sand grains into the wellbore. Gravel packing prevents this problem. In gravel packing, proppant is placed in the annulus of a wellbore, next to the unconsolidated formation fines, essentially working as a filter between the wellbore and the formation. The proppant is oftentimes held in place by a slotted screen which prevents the proppant (and formation fines) from migrating into the wellbore, while still allowing the formation fluids to do so. If the wellbore is cased, the casing is first perforated in order to establish fluid communication between the wellbore and the formation. The gravel packing process is generally performed in all formations that are considered to have unconsolidated formation fines, like those commonly found in the Gulf of Mexico.

Water injection wells can also be gravel packed because when a water injection well is shut-in, there can be a pressure surge or flowback into the wellbore which might result in an immediate flow of formation fines into the well. If formation fines are allowed to flow into the well, the formation could become plugged, which would prevent the resumption of injection of water into the well.

Similarly, wellbores can also be "frac packed". Frac packing involves the simultaneous hydraulic fracturing of a reservoir and the placement of a gravel pack in the annular region of the wellbore. In frac packing, a fracture is created using a high-viscosity fluid that is pumped into the formation at above the fracturing pressure. Gravel pack screens are in place at the time of pumping and function the same way as in a typical gravel packing operation. Creating the fracture helps improve production and/or injection rates while the gravel pack prevents formation fines from being produced and the gravel pack screens prevent the proppant particulates from entering the produced fluids and/or flowback fluids. This method allows for high conductivity channels to penetrate deeply into the formation while leaving the area around the wellbore undamaged.

In each case, to maximize an increase in permeability and prevent proppant flowback, the proppant particulates can be consolidated inside the propped fracture or a gravel packed or frac packed region, forming a "proppant pack." The proppant particulates can be consolidated by use of activators that react with the resin coating and cause consolidation of the proppant particulates. The activators are oftentimes mixed with the fracturing fluids and/or gravel pack fluids with the proppant particulates entrained therein. However, the activators can also compete with other chemicals usually present in the fracturing fluids and/or gravel-pack fluids, such as thickening agents or crosslinkers, reducing the effectiveness of any consolidation.

It is desirable to consolidate the proppant pack in the wellbore on demand with an activator in a way that does not compete with other chemicals, such as thickening agents, typically used in fracturing fluids and gravel-pack fluids. Therefore, a need exists for a method of consolidating a proppant pack downhole with an activator in the presence of a thickening agent.

BRIEF DESCRIPTION OF THE DRAWINGS

The present invention may best be understood by referring to the following description and accompanying drawings that are used to illustrate several exemplary embodiments of the invention. In the drawings.

DETAILED DESCRIPTION

Figure 1:
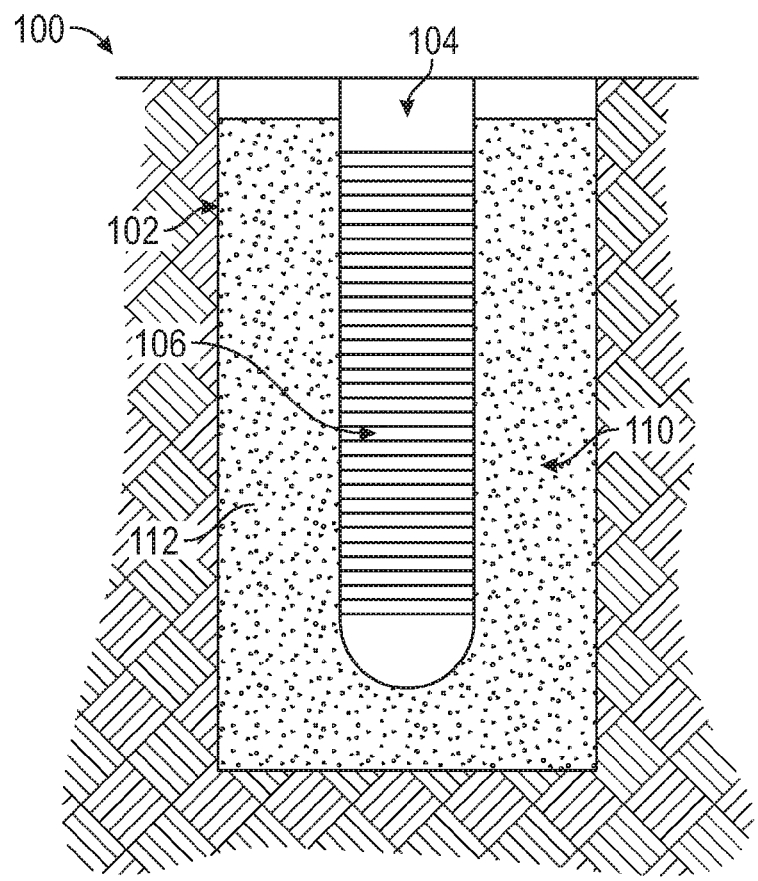
FIG. 1 depicts a perspective view of an illustrative gravel pack assembly containing a proppant pack, according to several exemplary embodiments of the present invention.

In the following description, numerous specific details are set forth. However, it is understood that embodiments of the invention may be practiced without these specific details. In other instances, well-known structures and techniques have not been described in detail in order not to obscure the understanding of this description.

As described herein, the term "apparent specific gravity" is defined as the weight per unit volume (grams per cubic centimeter) of proppant particulates, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples.

As described herein, the term "substantially round and spherical" and related forms, is defined to mean an average ratio of minimum diameter to maximum diameter of about 0.8 or greater, or having an average sphericity value of about 0.8 or greater compared to a Krumbein and Sloss chart.

As described herein, the term "novolac resin" is defined as a phenol-formaldehyde resin (or phenolic resin) with a formaldehyde to phenol molar ratio of less than one.

As described herein, the term "cured" means a resin coating containing less than or equal to 50% curability as defined by the standard test for acetone extraction.

As described herein, the term "activator" means a chemical or composition that crosslinks or otherwise reacts with a resin coating to form a bond and/or consolidated proppant pack.

As used herein, the term "thickener" refers to a thickening agent, gelling agent, polymer, and/or linear gel.

As described herein, the term "crosslinker" means an element, metal, chemical, and/or composition that causes and/or encourages one or more crosslinking reactions between two or more thickener molecules to provide a crosslinked fluid.

As described herein, the terms "breaker" or "gel breaker" refer to a chemical or agent that decreases the viscosity of a crosslinked gel or crosslinked thickener molecules.

As described herein, the term "unconsolidated" means proppant particulates that are not bonded to each other, either physically or chemically.

As described herein, the term "storage conditions" means temperatures of up to 150° F. and atmospheric pressure.

As described herein, the term "wellbore conditions" means temperatures of less than 220° F.

As described herein, the term "Unconfined Compressive Strength" (or "UCS") is defined as the bond strength of a consolidated proppant particulate sample and is measured in psi. Typically, a consolidated proppant pack with a UCS of at least 20-100 psi within a hydraulic fracture will not flowback into the wellbore.

As described herein, the term "gravel pack region" means a region of a wellbore that is adapted to contain a gravel pack.

As described herein, the term "frac pack region" means a region of a wellbore and its surrounding formation that is adapted to contain a frac pack.

According to several exemplary embodiments of the present invention, a proppant composition is provided that includes a plurality of unconsolidated particulates having a resin coating on the surface of the particulates, such that chemically active amine sites remain on the surface of the proppant particulates. The proppant composition can remain unconsolidated under storage conditions, inside a wellbore, and inside a subterranean fracture in the absence of an activator. For example, the proppant composition can remain unconsolidated in a gravel pack region or frac pack region in a wellbore in the absence of an activator. According to several exemplary embodiments of the present invention, the proppant composition remains unconsolidated under storage conditions of temperatures of up to 150° F., up to 100° F., or up to 50° F. and atmospheric pressure from about one month to about eighteen months.

According to several exemplary embodiments of the present invention, a method of hydraulic fracturing a subterranean formation is provided. According to several exemplary embodiments of the present invention, a method of gravel packing a wellbore is provided. According to several exemplary embodiments of the present invention, a method of frac packing a wellbore is provided. The methods can include mixing an activator with a liquid composition comprising water, a thickener, and a plurality of resin-coated proppant particulates to provide a slurry, introducing the slurry into a subterranean fracture, a gravel pack region of the wellbore, and/or a frac pack region of the wellbore and consolidating at least a portion of the plurality of resin-coated proppant particulates to provide a consolidated proppant pack. The consolidated proppant pack can also be a gravel pack and/or a frac-pack. The consolidated proppant pack can have a UCS of at least about 60 psi when formed under a pressure of about 0.01 psi to about 3,000 psi and a temperature of about 32° F. to about 250° F.

According to several exemplary embodiments of the present invention, the proppant composition remains unconsolidated under wellbore conditions of temperatures of up to 220° F., up to 200° F., up to 150° F., up to 100° F., or up to 50° F., and closure stress of up to 3,000 psi, up to 2,500 psi, up to 2,000 psi, up to 1,500 psi, up to 1,000 psi, up to 500 psi, up to 300 psi, up to 150 psi, up to 75 psi, up to 50 psi, or up to 35 psi. According to several exemplary embodiments, the proppant composition includes at least a portion thereof that remains unconsolidated under wellbore temperatures from about 32° F., about 40° F., about 60° F., or about 80° F. to about 120° F., about 140° F., or about 175°

F. and under closure stress from about 5 psi to about 60 psi, about 10 psi to about 45 psi, or about 25 psi to about 40 psi.

According to several exemplary embodiments, the proppant composition includes any suitable proppant particulates. Suitable proppant particulates can be any one or more of lightweight ceramic proppant, intermediate strength proppant, high strength proppant, natural frac sand, porous ceramic proppant, glass beads, natural proppant such as walnut hulls, and any other manmade, natural, ceramic or glass ceramic body proppants. According to several exemplary embodiments, the proppant particulates include silica and/or alumina in any suitable amounts. According to several exemplary embodiments, the proppant particulates include less than 80 wt %, less than 60 wt %, less than 40 wt %, less than 30 wt %, less than 20 wt %, less than 10 wt %, or less than 5 wt % silica based on the total weight of the proppant particulates. According to several exemplary embodiments, the proppant particulates include from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the proppant particulates include at least about 30 wt %, at least about 50 wt %, at least about 60 wt %, at least about 70 wt %, at least about 80 wt %, at least about 90 wt %, or at least about 95 wt % alumina based on the total weight of the proppant particulates. According to several exemplary embodiments, the proppant particulates include from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

According to several exemplary embodiments, the proppant composition includes proppant particulates that are substantially round and spherical having a size in a range between about 6 and 270 U.S. Mesh. For example, the size of the particulates can be expressed as a grain fineness number (GFN) in a range of from about 15 to about 300, or from about 30 to about 110, or from about 40 to about 70. According to such examples, a sample of sintered particles can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

According to several exemplary embodiments, the proppant composition includes proppant particulates having any suitable size. For example, the proppant particulates can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the proppant particles have a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the proppant particles have a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

According to several exemplary embodiments, the proppant composition includes proppant particulates having any suitable shape. The proppant particulates can be substantially round, cylindrical, square, rectangular, elliptical, oval, egg-shaped, or pill-shaped. For example, the proppant particulates can be substantially round and spherical. According to several exemplary embodiments, the proppant particulates of the proppant composition have an apparent specific gravity of less than 3.1 g/cm$^3$, less than 3.0 g/cm$^3$, less than 2.8 g/cm$^3$, or less than 2.5 g/cm$^3$. According to several exemplary embodiments, the proppant particulates have an apparent specific gravity of from about 3.1 to 3.4 g/cm$^3$. According to several exemplary embodiments, the proppant particulates have an apparent specific gravity of greater than 3.4 g/cm$^3$, greater than 3.6 g/cm$^3$, greater than 4.0 g/cm$^3$, or greater than 4.5 g/cm$^3$.

According to several exemplary embodiments, the proppant composition can have any suitable porosity. The proppant particulates can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the proppant particulates is from about 5% to about 75%, about 5% to about 15%, about 10% to about 30%, about 15% to about 35%, about 25% to about 45%, about 30% to about 55%, or about 35% to about 70%. According to several exemplary embodiments, the proppant particulates can have any suitable average pore size. For example, the proppant particulates can have an average pore size from about 2 nm, about 10 nm, about 15 nm, about 55 nm, about 110 nm, about 520 nm, or about 1,100 to about 2,200 nm, about 5,500 nm, about 11,000 nm, about 17,000 nm, or about 25,000 nm or more in its largest dimension. For example, the proppant particulates can have an average pore size from about 3 nm to about 30,000 nm, about 30 nm to about 18,000 nm, about 200 nm to about 9,000, about 350 nm to about 4,500 nm, or about 850 nm to about 1,800 nm in its largest dimension.

The proppant particles can have any suitable surface roughness. The proppant particles can have a surface roughness of less than 5 µm, less than 4 µm, less than 3 µm, less than 2.5 µm, less than 2 µm, less than 1.5 µm, or less than 1 µm. For example, the proppant particles can have a surface roughness of about 0.1 µm to about 4.5 µm, about 0.4 µm to about 3.5 µm, or about 0.8 µm to about 2.8 µm.

According to several exemplary embodiments of the present invention, the proppant particulates can be or include conventional pre-sintered proppants. Such conventional proppants can be manufactured up to the sintering step according to any suitable process including, but not limited to continuous spray atomization, spray fluidization, spray drying, or compression. Suitable conventional proppants and methods for their manufacture are disclosed in U.S. Pat. Nos. 4,068,718, 4,427,068, 4,440,866, 4,522,731, 4,623, 630, 4,658,899, and 5,188,175, the entire disclosures of which are incorporated herein by reference. The proppant particulates can also be manufactured in a manner that creates porosity in the proppant grain. A process to manufacture a suitable porous ceramic proppant is described in U.S. Pat. No. 7,036,591, the entire disclosure of which is incorporated herein by reference. The proppant particulates can also be manufactured according to any suitable drip-casting process including, but not limited to the methods disclosed in U.S. Pat. Nos. 8,865,631, 8,883,693, and 9,175, 210, and U.S. patent application Ser. Nos. 14/502,483 and 14/802,761, the entire disclosures of which are incorporated herein by reference.

According to several exemplary embodiments, at least a portion of the proppant particulates of the proppant composition are coated with a resin material. According to several exemplary embodiments, at least about 50%, at least about 75%, at least about 85%, at least about 90%, at least about 95%, or least about 99% of the proppant particulates in the proppant composition are coated with the resin material. For example, all of the proppant particulates in the proppant composition can be coated with the resin material.

According to several exemplary embodiments, at least a portion of the surface area of each of the coated proppant particulates is covered with the resin material. According to several exemplary embodiments, at least about 10%, at least about 25%, at least about 50%, at least about 75%, at least about 90%, at least about 95%, or at least about 99% of the surface area of the coated proppant particulates is covered with the resin material. According to several exemplary embodiments, about 40% to about 99.9%, about 85% to about 99.99%, or about 98% to about 100% of the surface area of the coated proppant particulates is covered with the resin material. According to several exemplary embodiments, the entire surface area of the coated proppant particulates is covered with the resin material. For example, the coated proppant particulates can be encapsulated with the resin material.

According to several exemplary embodiments, the resin material is present on the proppant particulates in any suitable amount. According to several exemplary embodiments, the resin coated proppant particulates contain at least about 0.1 wt % resin, at least about 0.5 wt % resin, at least about 1 wt % resin, at least about 2 wt % resin, at least about 4 wt % resin, at least about 6 wt % resin, at least about 10 wt % resin, or at least about 20 wt % resin, based on the total weight of the resin coated proppant particulates. According to several exemplary embodiments, the resin coated proppant particulates contain about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin, based on the total weight of the resin coated proppant particulates.

According to several exemplary embodiments, the resin material includes any suitable resin. For example, the resin material can include a phenolic resin, such as a phenol-formaldehyde resin. According to several exemplary embodiments, the phenol-formaldehyde resin has a molar ratio of formaldehyde to phenol (F:P) from a low of about 0.6:1, about 0.9:1, or about 1.2:1 to a high of about 1.9:1, about 2.1:1, about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1. The phenol-formaldehyde resin can also have a molar ratio of formaldehyde to phenol of about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

According to several exemplary embodiments, the phenol-formaldehyde resin has a molar ratio of less than 1:1, less than 0.9:1, less than 0.8:1, less than 0.7:1, less than 0.6:1, or less than 0.5:1. For example, the phenol-formaldehyde resin can be or include a phenolic novolac resin. Phenolic novolac resins are well known to those of ordinary skill in the art, for instance see U.S. Pat. No. 2,675,335 to Rankin, U.S. Pat. No. 4,179,429 to Hanauye, U.S. Pat. No. 5,218,038 to Johnson, and U.S. Pat. No. 8,399,597 to Pullichola, the entire disclosures of which are incorporated herein by reference. Suitable examples of commercially available novolac resins include novolac resins available from Plenco™, Durite® resins available from Momentive, and novolac resins available from S.I. Group.

According to several exemplary embodiments, the phenol-formaldehyde resin has a weight average molecular weight from a low of about 200, about 300, or about 400 to a high of about 1,000, about 2,000, or about 6,000. For example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. The phenol-formaldehyde resin can also have a weight average molecular weight of about 175 to about 800, about 700 to about 3,330, about 1,100 to about 4,200, about 230 to about 550, about 425 to about 875, or about 2,750 to about 4,500.

According to several exemplary embodiments, the phenol-formaldehyde resin has a number average molecular weight from a low of about 200, about 300, or about 400 to a high of about 1,000, about 2,000, or about 6,000. For example, the phenol-formaldehyde resin can have a number average molecular weight from about 250 to about 450, about 450 to about 550, about 550 to about 950, about 950 to about 1,500, about 1,500 to about 3,500, or about 3,500 to about 6,000. The phenol-formaldehyde resin can also have a number average molecular weight of about 175 to about 800, about 700 to about 3,000, about 1,100 to about 2,200, about 230 to about 550, about 425 to about 875, or about 2,000 to about 2,750.

According to several exemplary embodiments, the phenol-formaldehyde resin has a z-average molecular weight from a low of about 200, about 300, or about 400 to a high of about 1,000, about 2,000, or about 9,000. For example, the phenol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. The phenol-formaldehyde resin can also have a z-average molecular weight of about 175 to about 800, about 700 to about 3,330, about 1,100 to about 4,200, about 230 to about 550, about 425 to about 875, or about 4,750 to about 8,500.

According to several exemplary embodiments, the phenol-formaldehyde resin has a polydispersity index from a low of about 1, about 1.75, or about 2.5 to a high of about 2.75, about 3.5, or about 4.5. For example, the phenol-formaldehyde resin can have a polydispersity index from about 1 to about 1.75, about 1.75 to about 2.5, about 2.5 to about 2.75, about 2.75 to about 3.25, about 3.25 to about 3.75, or about 3.75 to about 4.5. The phenol-formaldehyde resin can also have a polydispersity index of about 1 to about 1.5, about 1.5 to about 2.5, about 2.5 to about 3, about 3 to about 3.35, about 3.35 to about 3.9, or about 3.9 to about 4.5.

According to several exemplary embodiments, the phenol-formaldehyde resin has any suitable viscosity. The phenol-formaldehyde resin can be a solid or liquid at 25° C. For example, the viscosity of the phenol-formaldehyde resin can be from about 1 centipoise (cP), about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the phenol-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the phenol-formaldehyde resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the phenol-formaldehyde resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C. The viscosity of the phenol-formaldehyde resin can be determined using a Brookfield viscometer.

According to several exemplary embodiments, the phenol-formaldehyde resin can have pH from a low of about 1, about 2, about 3, about 4, about 5, about 6, about 7 to a high of about 8, about 9, about 10, about 11, about 12, or about 13. For example, the phenol-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

According to several exemplary embodiments of the present invention, the resin coating applied to the proppant particulates is an epoxy resin. According to such embodiments, the resin coating can include any suitable epoxy resin. For example, the epoxy resin can include bisphenol A, bisphenol F, aliphatic, or glycidylamine epoxy resins, and any mixtures or combinations thereof. An example of a commercially available epoxy resin is BE188 Epoxy Resin, available from Chang Chun Plastics Co., Ltd.

According to several exemplary embodiments, the epoxy resin can have any suitable viscosity. The epoxy resin can be a solid or liquid at 25° C. For example, the viscosity of the epoxy resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the epoxy resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the epoxy resin can have a viscosity from about 1 cP to about 45 cP, about 45 cP to about 125 cP, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the epoxy resin can also be from about 500 cP, about 1,000 cP, about 2,500 cP, about 5,000 cP, or about 7,000 cP to about 10,000 cP, about 12,500 cP, about 15,000 cP, about 17,000 cP, or about 20,000 cP at a temperature of about 25° C. In another example, the epoxy resin can have a viscosity from about 1,000 cP to about 12,000 cP, about 2,000 cP to about 11,000 cP, about 4,000 cP to about 10,500 cP, or about 7,500 cP to about 9,500 cP at a temperature of about 25° C. The viscosity of the epoxy resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the epoxy resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C.

According to several exemplary embodiments, the epoxy resin can have pH from a low of about 1, about 2, about 3, about 4, about 5, about 6, about 7 to a high of about 8, about 9, about 10, about 11, about 12, or about 13. For example, the epoxy resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

Methods for coating proppant particulates with resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

According to one or more exemplary embodiments, any one or more of the proppant particulates can contain one or more chemical treatment agents. In one or more exemplary embodiments, the proppant particulates are coated and/or encapsulated with one or more chemical treatment agents. For example, the chemical treatment agent can be directly and/or indirectly coated onto at least a portion of an outermost surface of the proppant particulates. In another example, the chemical treatment agent can encapsulate the outermost surface of the proppant particulates. The chemical treatment agent can also be contained within a coating that coats or encapsulates at least a portion of the proppant particulates. In one or more exemplary embodiments, the chemical treatment agent can also be infused into any pores of the proppant particulates.

Suitable chemical treatment agents can be or include any one or more of tracers, scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants, combinations thereof, or any other suitable oilfield chemical. In one or more exemplary embodiments, the scale inhibitor can inhibit scales of calcium, barium, magnesium salts and the like, including barium sulfate, calcium sulfate, and calcium carbonate scales. The composites can further have applicability in the treatment of other inorganic scales, such as zinc sulfide, iron sulfide, etc. In one or more exemplary embodiments, the scale inhibitors are anionic scale inhibitors. The scale inhibitors can include strong acids such as a phosphonic acid, phosphoric acid, phosphorous acid, phosphate esters, phosphonate/phosphonic acids, aminopoly carboxylic acids, chelating agents, and polymeric inhibitors and salts thereof. The scale inhibitors can also include organo phosphonates, organo phosphates and phosphate esters as well as the corresponding acids and salts thereof. The scale inhibitors can also include polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS). In one or more exemplary embodiments, the scale inhibitors can include DTPA, (also known as diethylenetriaminepentaacetic acid; diethylenetriamine-N,N,N',N',N"-pentaacetic acid; pentetic acid; N,N-Bis(2-(bis-(carboxymethyl)amino)ethyl)-glycine; diethylenetriamine pentaacetic acid, [[(Carboxymethyl)imino]bis(ethylenenitrilo)]-tetra-acetic acid); EDTA: (also known as edetic acid; ethylenedinitrilotetraacetic acid; EDTA free base; EDTA free acid; ethylenediamine-N,N,N',N'-tetraacetic acid; hampene; Versene; N,N'-1,2-ethane diylbis-(N-(carboxymethyl)glycine); ethylenediamine tetra-acetic acid); NTA, (also known as N,N-bis(carboxymethyl) glycine; triglycollamic acid; trilone A; alpha,alpha',alpha"-trimethylaminetricarboxylic acid; tri(carboxymethyl)amine; aminotriacetic acid; Hampshire NTA acid; nitrilo-2,2',2"-triacetic acid; titriplex i; nitrilotriacetic acid); APCA (aminopolycarboxylic acids); phosphonic acids; EDTMP (ethylenediaminetetramethylene-phosphonic acid); DTPMP (diethylene triaminepentamethylenephosphonic acid); NTMP (nitrilotrimethylenephosphonic acid); polycarboxylic acids, gluconates, citrates, polyacrylates, and polyaspartates or any combination thereof. The scale inhibitors can also include any of the ACCENT™ scale inhibitors, commercially available from The Dow Chemical Company. The scale inhibitors can also include potassium salts of maleic acid copolymers. In one or more exemplary embodiments, the chemical treatment agent is DTPMP.

In one or more exemplary embodiments, the chemical treatment agent can be or include any one or more demulsifying agents. The demulsifying agents can include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of same. The demulsifying agents can also include oxyalkylated phenol formaldehyde resins, oxyalkylated amines and polyamines, di-epoxidized oxyalkylated polyethers, poly triethanolamine methyl chloride quaternary, melamine acid colloid, and aminomethylated polyacrylamide.

In one or more exemplary embodiments, the chemical treatment agent can be or include any one or more corrosion inhibitors. Suitable corrosion inhibitors can include, but are not limited to, fatty imidazolines, alkyl pyridines, alkyl pyridine quaternaries, fatty amine quaternaries and phosphate salts of fatty imidazolines. In one or more exemplary embodiments, the chemical treatment agent can be or include any one or more suitable foaming agents. Suitable foaming agents can include, but are not limited to, oxyalkylated sulfates or ethoxylated alcohol sulfates, or mixtures thereof. In one or more exemplary embodiments, the chemical treatment agent can be or include any one or more suitable oxygen scavengers. Suitable oxygen scavengers can include triazines, maleimides, formaldehydes, amines, carboxamides, alkylcarboxyl-azo compounds cumine-peroxide compounds morpholino and amino derivatives morpholine and piperazine derivatives, amine oxides, alkanolamines, aliphatic and aromatic polyamines.

In one or more exemplary embodiments, the chemical treatment agent can be or include any one or more paraffin inhibitors. Suitable paraffin inhibitors can include, but are not limited to, ethylene/vinyl acetate copolymers, acrylates (such as polyacrylate esters and methacrylate esters of fatty alcohols), and olefin/maleic esters. In one or more exemplary embodiments, the chemical treatment agent can be or include any one or more asphaltene inhibitors. Suitable asphaltene inhibitors can include, but are not limited to, asphaltene treating chemicals include but are not limited to fatty ester homopolymers and copolymers (such as fatty esters of acrylic and methacrylic acid polymers and copolymers) and sorbitan monooleate.

In one or more exemplary embodiments, the chemical treatment agent can be or include a thermal neutron absorbing material. In one or more exemplary embodiments, the thermal neutron absorbing material is boron, cadmium, gadolinium, iridium, samarium, or mixtures thereof. The thermal neutron absorbing material can leach, elute, diffuse, bleed, discharge, desorb, dissolve, drain, seep, and leak from the proppant and into a fracture, a formation, and/or a wellbore. A downhole tool emitting thermal neutrons can detect the presence of the thermal neutron absorbing material to detect proppant placement, producing and non-producing regions, and fracture size, shape, and location. The downhole tool can also detect the presence of the thermal neutron absorbing material to detect the quality and percent fill of the gravel pack and/or the frac pack in the gravel pack and/or frac pack regions of the wellbore.

In one or more exemplary embodiments, the phenol-formaledehyde resins and/or epoxy resins are semi-permeable such that one or more of the chemical treatment agents can leach, elute, diffuse, bleed, discharge, desorb, dissolve, drain, seep, or leak from the coated proppant particulates at any suitable rate. According to one or more exemplary embodiments, the chemical treatment agents can leach, elute, diffuse, bleed, discharge, desorb, dissolve, drain, seep, or leak from the coated proppant particulates at a rate of at least about 0.1 parts-per-million per gram of proppant particulates per day (expressed herein as ppm/(gram*day)), at least about 0.5 ppm/(gram*day), at least about 1 ppm/(gram*day), at least about 1.5 ppm/(gram*day), at least about 2 ppm/(gram*day), at least about 3 ppm/(gram*day), at least about 5 ppm/(gram*day), at least about 7 ppm/(gram*day), or at least about 10 ppm/(gram*day) for at least about 2 months, at least about 6 months, at least about 9 months, at least about 1 year, or at least about 2 years. For example, chemical treatment agents can elute from the coated proppant particulates at a rate from about 0.01 ppm/(gram*day), about 0.075 ppm/(gram*day), about 0.1 ppm/(gram*day), about 0.25 ppm/(gram*day), about 0.75 ppm/(gram*day), about 1.5 ppm/(gram*day), about 2.25 ppm/(gram*day), or about 3 ppm/(gram*day) to about 4 ppm/(gram*day), about 5 ppm/(gram*day), about 6 ppm/(gram*day), about 7 ppm/(gram*day), about 8 ppm/(gram*day), about 9 ppm/(gram*day), about 10 ppm/(gram*day), about 20 ppm/(gram*day), about 30 ppm/(gram*day), or about 50 ppm/(gram*day) for at least about 2 months, at least about 6 months, at least about 9 months, at least about 1 year, or at least about 2 years.

According to several exemplary embodiments of the present invention, a curing agent is applied to the resin during coating of the proppant particulates in order to accelerate the transition of the resin from a liquid to a solid state. Suitable curing agents include curing agents that will leave active amine or epoxy sites on the surface of the resin coating. Suitable curing agents will depend on the specific resin chemistry employed and can include amines, acids, acid anhydrides, and epoxies. In several exemplary embodiments of the present invention, a phenolic resin material is applied to the surface of the proppant particulates and cured with an amine curing agent in order to leave active amine sites on the resin coated surface of the proppant particulates. In several exemplary embodiments, the phenolic resin is cured with hexamethylenetetramine, also known as hexamine.

According to several exemplary embodiments, the epoxy resin can be cured with an epoxy curing agent that leaves active epoxy sites on the resin coated surface of the proppant particulate. In one or more exemplary embodiments, the epoxy resin can be cured with an epoxy curing agent that leaves active curing agent functionality on the resin coated surface of the proppant particulate. Examples of commercially available epoxy curing agents include Ancamine® 1638 and Ancamine® 2167, which are both available from Air Products and Chemicals, Inc.

According to several exemplary embodiments, the resin coated proppant particulates are cured in any suitable amounts. As used herein, the term "curability" refers to an amount in weight percent of the resin material that is not cured. The resin coated proppant particulates can have a curability of at least about 5 wt %, at least about 15 wt %, at least about 20 wt %, at least about 25 wt %, or at least about 30 wt %. For example, the resin coated proppant particulates can have a curability of from about 5 wt % to about 45 wt %, from about 10 wt % to about 40 wt %, from about 20 wt % to about 38 wt %, from about 25 wt % to about 35 wt %, or from about 27 wt % to about 32 wt %.

According to several exemplary embodiments, the cured resin-coated proppant composition is injected into a well during fracturing operations via suspension in a fracturing fluid, and deposited into induced fractures. According to several exemplary embodiments of the present invention, the resin-coated proppant is injected into an annular region outside of the wellbore, behind a gravel pack screen, via suspension in a gravel pack fluid. According to several exemplary embodiments, the cured resin-coated proppant composition is injected into a well during fracturing operations via suspension in a frac pack fluid, and deposited into the wellbore and the induced fractures. Suitable fracturing fluids, gravel pack fluids, and frac pack fluids are well known to those of ordinary skill in the art and can include guar gum.

According to several exemplary embodiments of the present invention, the plurality of resin-coated proppant particulates residing in a propped fracture or in a gravel packed or frac packed region of the wellbore are contacted by an activator which cross-links with the resin-coated proppant particulates in order to form a consolidated proppant pack. According to several exemplary embodiments of the present invention, the activator is suspended in an unbroken fracturing fluid, gravel pack fluid, or frac pack fluid along with the resin-coated proppant particulates. According to several exemplary embodiments, the fracturing fluid, gravel pack fluid, and/or frac pack fluid includes from about one to about two percent by weight of the activator. The fracturing fluid, gravel pack fluid, and frac pack fluid can be the same or at least substantially equivalent to one another.

According to several exemplary embodiments, the fracturing fluid includes any suitable amount of the activator. For example, the fracturing fluid can include about 0.01 wt %, about 0.05 wt %, about 0.1 wt %, about 0.5 wt %, or about 1 wt % to about 1.5 wt %, about 2 wt %, about 2.5 wt %, about 3 wt %, about 5 wt %, or about 10 wt % of the activator. The fracturing fluid can include about 0.025 wt % to about 8 wt %, about 0.25 wt % to about 6 wt %, about 0.75 wt % to about 4 wt %, about 0.95 wt % to about 2.75 wt %, or about 1 wt % to about 2 wt % of the activator. An activator to resin weight ratio in the fracturing fluid can be about 0.001:1 to about 100:1, about 0.01 to about 50:1, about 0.05:1 to about 20:1, about 0.1:1 to about 10:1, about 0.5:1 to about 5:1, about 0.8:1 to about 3:1, or about 0.9:1 to about 1.5:1.

According to several exemplary embodiments, the gravel pack fluid includes any suitable amount of the activator. For example, the gravel pack fluid can include about 0.01 wt %, about 0.05 wt %, about 0.1 wt %, about 0.5 wt %, or about 1 wt % to about 1.5 wt %, about 2 wt %, about 2.5 wt %, about 3 wt %, about 5 wt %, or about 10 wt % of the activator. The gravel pack fluid can include about 0.025 wt % to about 8 wt %, about 0.25 wt % to about 6 wt %, about 0.75 wt % to about 4 wt %, about 0.95 wt % to about 2.75 wt %, or about 1 wt % to about 2 wt % of the activator. An activator to resin weight ratio in the gravel pack fluid can be about 0.001:1 to about 100:1, about 0.01 to about 50:1, about 0.05:1 to about 20:1, about 0.1:1 to about 10:1, about 0.5:1 to about 5:1, about 0.8:1 to about 3:1, or about 0.9:1 to about 1.5:1.

According to several exemplary embodiments, the frac pack fluid includes any suitable amount of the activator. For example, the frac pack fluid can include about 0.01 wt %, about 0.05 wt %, about 0.1 wt %, about 0.5 wt %, or about 1 wt % to about 1.5 wt %, about 2 wt %, about 2.5 wt %, about 3 wt %, about 5 wt %, or about 10 wt % of the activator. The frac pack fluid can include about 0.025 wt % to about 8 wt %, about 0.25 wt % to about 6 wt %, about 0.75 wt % to about 4 wt %, about 0.95 wt % to about 2.75 wt %, or about 1 wt % to about 2 wt % of the activator. An activator to resin weight ratio in the frac pack fluid can be about 0.001:1 to about 100:1, about 0.01 to about 50:1, about 0.05:1 to about 20:1, about 0.1:1 to about 10:1, about 0.5:1 to about 5:1, about 0.8:1 to about 3:1, or about 0.9:1 to about 1.5:1.

The activator can include any one or more suitable liquid epoxy resins and solid epoxy resins. The activator can include any one or more bisphenyl A epoxy resins, modified bispheynl A epoxy resins, modified bisphenyl A/F epoxy resins, bispheynl F epoxy resins, and/or flexible epoxy resins. The activator can include water dispersible liquid epoxy resins, water dispersible solid epoxy resins, amine-rich resins, and flexible epoxy resins and any mixture thereof. As used herein, the term "flexible epoxy resins" refers to epoxy resins having elastomeric chains in their backbone. The elastomeric chains can include polyether chains prepared from one or more alkylene oxides. In one or more embodiments, the flexible epoxy resin can include in its backbone ethylene oxide, propylene oxide or a mixture thereof.

Examples of suitable liquid epoxy resins are D.E.R.™ 317, D.E.R. 321, D.E.R. 331, D.E.R. 332, D.E.R. 351, D.E.R. 354, D.E.R. 3913, D.E.R. 732 and D.E.R. 736, which are commercially available from Dow Chemical. Examples of an water dispersible liquid epoxy is D.E.R. 383 and XY 92589.00, which is available from Dow Chemical, and EPOTUF 38-690, which is available from Reichhold Inc. Examples of commercially available water dispersible solid epoxy resins include Ancarez® AR462 Resin and Ancarez AR555 Epoxy Resin, which are available from Air Products and Chemicals, Inc. and D.E.R. 671, D.E.R. 916 Epoxy Resins, which are available from Dow Chemical.

In one or more exemplary embodiments, the activator can be or include any combination of D.E.R. 3913, D.E.R. 732, and/or D.E.R. 736. For example, the activator can be a two component blend of D.E.R. 3913 and D.E.R. 732. The activator can contain D.E.R. 3913 and D.E.R. 732 in any suitable amounts. For example, the activator can contain from about 1 wt %, about 5 wt %, about 10 wt %, about 20 wt %, about 30 wt %, about 40 wt %, or about 45 wt % to about 55 wt %, about 60 wt %, about 70 wt %, about 80 wt %, about 90 wt %, about 95 wt %, or about 99 wt % D.E.R.

3913 and from about 1 wt %, about 5 wt %, about 10 wt %, about 20 wt %, about 30 wt %, about 40 wt %, or about 45 wt % to about 55 wt %, about 60 wt %, about 70 wt %, about 80 wt %, about 90 wt %, about 95 wt %, or about 99 wt % D.E.R. 732.

According to several exemplary embodiments, suitable activators for epoxy resins cured with an epoxy coating that leaves active epoxy sites on the resin coated surface of the proppant particulate include water dispersible amine-rich resins. Examples of commercially available water dispersible amine-rich resin activators include Anquamine® 701 and Anquawhite™ 100, which are both available from Air Products and Chemicals, Inc., and EPOTUF 37-685, EPOTUF 37-667, and EPOTUF37-680 available from Reichhold Inc. Suitable activators for epoxy resins cured with an epoxy coating that leaves active epoxy sites on the resin coated surface of the proppant particulate can also include amine-rich resins that are not water soluble and/or not water dispersible, for example, Ancamine® 1638 and Ancamine 2167, which are both commercially available from Air Products and Chemicals, Inc.

The activator can have any suitable viscosity. In one or more exemplary embodiments, the activator has a viscosity from about 4, about 8, about 12, about 20, or about 30 to about 35, about 45, about 55, about 65, about 75, or about 95 cSt at 25° C. in accordance with ASTM D445.

In one or more exemplary embodiments, the activator can be infused into at least a portion of any one or more pores of one or more of the proppant particulates. The activator can be infused with or without the use of a solvent. Methods for infusing a porous proppant particulate are well known to those of ordinary skill in the art, for instance see U.S. Pat. Nos. 5,964,291 and 7,598,209, and similar processes such as vacuum infusion, thermal infusion, capillary action, ribbon blending at room or elevated temperature, microwave blending or pug mill processing can be utilized to infuse porous proppant particulates with an activator according to several exemplary embodiments of the present invention. It has been found that infusing the activator into pores of the proppant particulates can encourage the activator to stay on the surface of the proppant particulates. Once the activator has eluted from the pores, most of the activator should remain at or near the proppant surface(s) because the activator has a greater affinity for the resin coat of the proppant particulates than for the crosslinked fluid.

In one or more exemplary embodiments, the phenol-formaledehyde resins and/or epoxy resins are semi-permeable such that the activator can leach, elute, diffuse, bleed, discharge, desorb, dissolve, drain, seep, or leak from the coated proppant particulates at any suitable rate. According to one or more exemplary embodiments, the activator can leach, elute, diffuse, bleed, discharge, desorb, dissolve, drain, seep, or leak from the coated proppant particulates at a rate of at least about 0.1 parts-per-million per gram of proppant particulates per day (expressed herein as ppm/(gram*day)), at least about 0.5 ppm/(gram*day), at least about 1 ppm/(gram*day), at least about 1.5 ppm/(gram*day), at least about 2 ppm/(gram*day), at least about 5 ppm/(gram*day), at least about 15 ppm/(gram*day), at least about 50 ppm/(gram*day), or at least about 100 ppm/(gram*day) for at least about 1 day, at least about 1 week, at least about 1 month, at least about 2 months, or at least about 6 months. For example, the activator can elute from the coated proppant particulates at a rate from about 0.01 ppm/(gram*day), about 0.1 ppm/(gram*day), about 0.5 ppm/(gram*day), about 1 ppm/(gram*day), about 2 ppm/(gram*day), about 5 ppm/(gram*day), about 10 ppm/(gram*day), or about 50 ppm/(gram*day) to about 55 ppm/(gram*day), about 65 ppm/(gram*day), about 75 ppm/(gram*day), about 85 ppm/(gram*day), about 100 ppm/(gram*day), about 125 ppm/(gram*day), about 150 ppm/(gram*day), about 200 ppm/(gram*day), about 300 ppm/(gram*day), or about 500 ppm/(gram*day) for at least about 1 day, at least about 1 week, at least about 1 month, at least about 2 months, or at least about 6 months.

In one or more embodiments, the activator infused proppant particulates can be uncoated (not coated with the resin material(s) disclosed herein). The uncoated infused particulates can be mixed with the resin coated particulates to provide a proppant mixture. About 10% of the particulates of the proppant mixture can be the uncoated infused particulates. The uncoated infused particulates can have the one or more chemical treatment agents and/or the activator infused throughout, in at least a portion of, or in an outer portion of its pores.

In one or more exemplary embodiments, the activator can leach, elute, diffuse, bleed, discharge, desorb, dissolve, drain, seep, or leak from the uncoated proppant particulates at any suitable rate. According to one or more exemplary embodiments, the activator can leach, elute, diffuse, bleed, discharge, desorb, dissolve, drain, seep, or leak from the uncoated proppant particulates at a rate of at least about 0.1 ppm/(gram*day), at least about 0.5 ppm/(gram*day), at least about 1 ppm/(gram*day), at least about 1.5 ppm/(gram*day), at least about 2 ppm/(gram*day), at least about 5 ppm/(gram*day), at least about 15 ppm/(gram*day), at least about 50 ppm/(gram*day), or at least about 100 ppm/(gram*day) for at least about 1 day, at least about 1 week, at least about 1 month, at least about 2 months, or at least about 6 months. For example, the activator can elute from the coated proppant particulates at a rate from about 0.01 ppm/(gram*day), about 0.1 ppm/(gram*day), about 0.5 ppm/(gram*day), about 1 ppm/(gram*day), about 2 ppm/(gram*day), about 5 ppm/(gram*day), about 10 ppm/(gram*day), or about 50 ppm/(gram*day) to about 55 ppm/(gram*day), about 65 ppm/(gram*day), about 75 ppm/(gram*day), about 85 ppm/(gram*day), about 100 ppm/(gram*day), about 125 ppm/(gram*day), about 150 ppm/(gram*day), about 200 ppm/(gram*day), about 300 ppm/(gram*day), or about 500 ppm/(gram*day) for at least about 1 day, at least about 1 week, at least about 1 month, at least about 2 months, or at least about 6 months.

According to several exemplary embodiments of the present invention, both resin coated proppant particulates and uncoated proppant particulates are suspended in a fracturing fluid, gravel pack fluid, or frac pack fluid. The resin coated proppant particulates and uncoated proppant particulates can be suspended in the fracturing fluid, gravel pack fluid, or frac pack fluid in any suitable amounts. For example, the fracturing fluid, gravel pack fluid, or frac pack fluid can include about 1 wt %, about 5 wt %, about 10 wt %, about 20 wt %, about 30 wt %, or about 40 wt % to about 50 wt %, about 60 wt %, about 70 wt %, about 80 wt %, about 90 wt %, about 95 wt %, or about 99 wt % resin coated proppant particulates and about 0.1 wt %, about 0.5 wt %, about 1 wt %, about 2 wt %, about 3 wt %, or about 5 wt % to about 8 wt %, about 10 wt %, about 12 wt %, about 15 wt %, or about 20 wt % uncoated proppant particulates. The resin coated proppant particulates and uncoated proppant particulates can be present in the fracturing fluid or gravel pack fluid with a uncoated proppant particulates to resin coated proppant particulates weight ratio of about 0.001:1 to about 1:1, about 0.05:1 to about 0.5:1, about 0.075:1 to about 0.25:1, about 0.1:1 to about 0.2:1, or about 0.075:1 to about 0.15:1.

The uncoated proppant particulates can be infused with one or more chemical treatment agents and/or one or more activators. In one or more exemplary embodiments, the uncoated proppant particulate portion of the consolidated proppant pack can include at least about 1 wt %, at least about 2 wt %, at least about 5 wt %, at least about 10 wt %, at least about 20 wt %, at least about 30 wt %, at least about 50 wt %, or at least about 75 wt % or more proppant particulates infused with the one or more chemical treatment agents. In one or more exemplary embodiments, the uncoated proppant particulate portion of the consolidated proppant pack can include at least about 1 wt %, at least about 2 wt %, at least about 5 wt %, at least about 10 wt %, at least about 20 wt %, at least about 30 wt %, at least about 50 wt %, or at least about 75 wt % or more proppant particulates infused with the activator.

According to several exemplary embodiments of the present invention, suitable activators can also be suspended in the fracturing fluid, gravel pack fluid, or frac pack fluid. The activators can be suspended with or in lieu of the activator infused proppant particulates. Commercially available examples of the resin coatings and activators are listed above. The suitable activators can be suspended in the fracturing fluid, gravel pack fluid, or frac pack fluid in any suitable amounts. For example, the amine-cured phenolic resin compatible activators can be present in the fracturing fluid, gravel pack fluid, or frac pack fluid in amounts of about 0.01 wt %, about 0.05 wt %, about 0.1 wt %, about 0.25 wt %, or about 0.5 wt % to about 1 wt %, about 1.5 wt %, about 2 wt %, about 2.5 wt %, about 5 wt %, or about 10 wt % based on the total combined weight of the fracturing fluid, gravel pack fluid, or frac pack fluid, respectively. The fracturing fluid, gravel pack fluid, or frac pack fluid can include about 0.025 wt % to about 8 wt %, about 0.15 wt % to about 4 wt %, about 0.35 wt % to about 3.5 wt %, about 0.55 wt % to about 2.75 wt %, or about 0.75 wt % to about 2 wt % amine-cured phenolic resin compatible activator. The epoxy resin compatible activators can also be present in the fracturing fluid, gravel pack fluid, or frac pack fluid in amounts of about 0.01 wt %, about 0.05 wt %, about 0.1 wt %, about 0.25 wt %, or about 0.5 wt % to about 1 wt %, about 1.5 wt %, about 2 wt %, about 2.5 wt %, about 5 wt %, or about 10 wt % based on the total combined weight of the fracturing fluid, gravel pack fluid, or frac pack fluid, respectively. The fracturing fluid, gravel pack fluid, or frac pack fluid can include about 0.025 wt % to about 8 wt %, about 0.15 wt % to about 4 wt %, about 0.35 wt % to about 3.5 wt %, about 0.55 wt % to about 2.75 wt %, or about 0.75 wt % to about 2 wt % of the epoxy resin compatible activator. The amine-cured phenolic resin compatible activators and epoxy resin compatible activators can be present in the fracturing fluid, gravel pack fluid, or frac pack fluid with an amine-cured phenolic resin compatible activator to epoxy resin compatible activator weight ratio of about 0.01:1 to about 20:1, about 0.1:1 to about 10:1, about 0.5:1 to about 5:1, about 0.8:1 to about 3:1, or about 0.9:1 to about 1.5:1.

The fracturing fluid, gravel pack fluid, or frac pack fluid can include any suitable thickener, such as a thickening agent, gelling agent, polymer, or linear gel. For example, the fracturing fluid, gravel pack fluid, or frac pack fluid can include guar, guar gum, xanthan gum, mineral oil, locust bean gum, hydroxypropyl guar (HPG), carboxymethyl guar (CMG), carboxymethylhydroxypropyl guar (CMHPG), starches, polysaccharides, alginates, mineral oils, cellulosic materials such as hydroxyethylcellulose (HEC), ethylcellulose, methylcellulose, sodium carboxymethylcellulose, hydroxypropylcellulose, hydroxyethylcellulose, and synthetic polymers such as polyacrylamides, and any combination or mixture thereof.

The fracturing fluid, gravel pack fluid, or frac pack fluid can also include any suitable crosslinker. The crosslinker can be or include boron, zirconium, titanium, chromium, iron, or aluminum or any combination thereof. For example, the crosslinker can be or include boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, titanium lactate, titanium malate, titanium citrate, titanium ammonium lactate, titanium triethanolamine, titanium acetylacetonate, aluminum lactate, and aluminum citrate, and any combination or mixture thereof. The crosslinker can also be or include borate materials such as anhydrous sodium tetraborate.

The crosslinking reaction can be delayed by use of a buffer contained in the fracturing fluid, gravel pack fluid, and/or frac pack fluid. The buffer can adjust the pH of the fluid to delay crosslinking for a desired period of time. For example, the buffer can adjust the fracturing fluid, gravel pack fluid, and/or frac pack fluid pH to from about 5.5, about 6, about 6.5, or about 6.8 to about 7.2, about 7.5, about 8, or about 8.5 to achieve a desired delay. In one or more exemplary embodiments, the crosslinking can be delayed by about 1 second, about 2 seconds, about 5 seconds, about 10 seconds, about 30 seconds, about 1 minute, about 2 minutes, or about 4 minutes to about 6 minutes, about 8 minutes, about 10 minutes, about 15 minutes, about 30 minutes, or about 60 minutes. The crosslinking can be delayed by about 1 second to about 5 minutes, from about 30 seconds to about 3 minutes, or from about 1 minute to about 2 minutes. In one or more exemplary embodiments, the buffer can be or include one or more of sodium carbonate, sodium bicarbonate, sodium hydroxide, monosodium phosphate, formic acid, fumaric acid, hydrochloric acid, magnesium oxide, sodium acetate, acetic acid, sulfamic acid, or the like. In one or more exemplary embodiments, the crosslinker is a delayed crosslinker. The delayed crosslinker can be self-buffered and/or temperature activated. For example, the delayed crosslinker can be or include one or more of BC-200, CL-23, or CL-24, commercially available from Halliburton Energy Services, Inc. or YF100FlexD, which is commercially available from Schlumberger Technology Corporation.

The fracturing fluid, gravel pack fluid, or frac pack fluid can also include any suitable breaker, such as a gel breaker. The breaker can be or include any type of oxidizing breaker. The breaker can be or include a persulfate, an encapsulated persulfate, or ammonia or any combination or mixture thereof. For example, the breaker can be or include one or more of SP breaker, ViCon NF breaker, Oxol II breaker, GBW-40 brekaer, or HT breaker commercially available from Halliburton Energy Services, Inc. The breaker can be used in combination with a catalyst to accelerate the breaker activity. For example, the breaker can be used in combination with CAT-OS-1 and/or CAT-OS-2 catalyst commercially available from Halliburton Energy Services, Inc. In one or more exemplary embodiments, the breaker can include metal halide salts, such as lithium chloride (LiCl), sodium chloride (NaCl), potassium chloride (KCl), rubidium chloride (RbCl), or cesium chloride (CsCl), or any mixtures or combinations thereof. In one or more exemplary embodiments, the breaker can provide a fast break of the fracturing fluid, gravel pack fluid, or frac pack fluid. For example, a gel break time of the fracturing fluid, gravel pack fluid, or frac pack fluid of less than 48 hours, less than 36 hours, less than 24 hours, less than 18 hours, less than 12 hours, less than 6 hours, less than 4 hours, less than 2 hours, or less than 1 hour.

The crosslinker, activator, thickener, breaker and proppant composition can be mixed or otherwise combined in any suitable manner and sequence to provide the fracturing fluid, gravel pack fluid, and/or frac pack fluid. In one or more exemplary embodiments, the fracturing fluid, gravel pack fluid, and/or frac pack fluid is obtained by providing an aqueous solution containing the activator and the thickener, mixing the proppant composition and breaker with the aqueous solution to provide a slurry, and adding the crosslinker to the slurry to provide the fracturing fluid, gravel pack fluid, and/or frac pack fluid. In one or more exemplary embodiments, the fracturing fluid, gravel pack fluid, and/or frac pack fluid is obtained by providing a slurry containing the proppant composition and the thickener, mixing the activator and breaker with the slurry to provide an activated slurry, and adding the crosslinker to the activated slurry to provide the fracturing fluid, gravel pack fluid, and/or frac pack fluid. In one or more exemplary embodiments, the fracturing fluid, gravel pack fluid, and/or frac pack fluid is obtained by providing an aqueous solution containing the activator and the thickener, mixing the crosslinker and breaker with the aqueous solution to provide a base fluid, and adding the proppant composition to the base fluid to provide the fracturing fluid, gravel pack fluid, and/or frac pack fluid. In one or more exemplary embodiments, the crosslinker is a delayed crosslinker that activates and causes crosslinking when the fracturing fluid, gravel pack fluid, and/or frac pack fluid is being pumped on the surface, is being pumped downhole in a wellbore, is being placed into a gravel pack region and/or a frac pack region, and/or is being placed into a subterranean fracture. In one or more exemplary embodiments, the breaker composition and concentration rapidly reduces the fracturing fluid, gravel pack fluid, and/or frac pack fluid viscosity after the proppant is pumped into the fracture and gravel pack annulus, facilitating rapid proppant grain to proppant grain contact.

The fracturing fluid, gravel pack fluid, and/or frac pack fluid with suspended resin-coated proppant particles and one or more suitable activators can have any suitable viscosity and pH. For example, the fracturing fluid, gravel pack fluid, and/or frac pack fluid can have a viscosity of about 0.01 cP, about 0.05 cP, about 0.1 cP, about 0.5 cP, or about 1 cP to about 2 cP, about 3 cP, about 5 cP, about 7 cP, about 10 cP, about 50 cP, about 100 cP, about 200 cP, about 500 cP, about 1,000 cP, about 5,000 cP, or about 10,000 cP at a temperature of about 25° C. The fracturing fluid, gravel pack fluid, and/or frac pack fluid can have a pH of about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13. The fracturing fluid, gravel pack fluid, and/or frac pack fluid can remain pumpable for up to about 45 minutes, up to about 1.5 hr, up to about 2 hr, up to about 4 hr, up to about 8 hr, up to about 12 hr, up to about 24 hr, or up to about 48 hr at temperatures of about 100° F., about 130° F., or about 150° F. to about 175° F., about 200° F., or about 220° F.

Due to the turbulent fluid flow associated with the injection of a fracturing fluid, gravel pack fluid, and/or frac pack fluid into a well bore, the consolidation reaction between the resin-coated proppant particulates and the activator may not start immediately to any substantive degree. Once the resin-coated proppant particulates are placed in the fractures or gravel packed or frac packed region, the well can be shut in, which allows the consolidation reaction between the resin-coated proppant particulates and the activator to begin. According to several exemplary embodiments of the present invention, the well can be shut in for about 4 hours up to one week, depending on the downhole temperature and pressure conditions. For example, the well can be shut in for about 5 hours, about 10 hours, about 15 hours, or about 24 hours to about 2 days, about 3 days, about 5 days or about 7 days before the resin-coated proppant particulates are consolidated into a consolidated proppant pack. One of ordinary skill in the art would be able to determine how long the well needs to be shut in in order for the consolidation reaction to take place at a given set of well conditions.

According to one or more embodiments, when the activator contacts the resin-coated proppant particulates, a crosslinking reaction occurs between adjacent proppant particulates, which in turn then forms a consolidated proppant pack. According to several exemplary embodiments of the present invention, the resin-coated proppant particulates are consolidated by bonding between the activator and proppant particulates, bonding of the proppant particulates to each other, or combinations thereof. The consolidated proppant pack can include any amount of the resin coated proppant particulates. According to several exemplary embodiments, at least about 50%, at least about 75%, at least about 85%, at least about 90%, at least about 95%, or least about 99% of the proppant particulates forming the consolidated proppant pack are coated with the resin material. In one or more exemplary embodiments, less than about 99%, less than about 95%, less than about 92%, less than about 90%, or less than about 88% of the proppant particulates forming the consolidated proppant pack are coated with the resin material. For example, the consolidated proppant pack can include at least about 1%, at least about 2%, at least about 5%, at least about 7%, at least about 10%, at least about 12%, or at least about 15% uncoated proppant particulates. The uncoated proppant particulates can be or include the porous proppant particulates infused with the one or more chemical treatment agents as described herein. The uncoated proppant particulates can also be or include the porous proppant particulates infused with the activator as described herein. In one or more exemplary embodiments, all of the proppant particulates in the proppant composition can be coated with the resin material.

Once the resin-coated proppant particulates are placed in the formation, gravel pack or frac pack, the fracturing fluid, gravel pack fluid, and/or frac pack fluid can be "broken". Breaking the fracturing fluid, gravel pack fluid, and/or frac pack fluid can allow the fluid to be removed from the fractures or gravel packed or frac packed region of the subterranean formation without dislodging the consolidated proppant pack. In one or more exemplary embodiments, the activator does not interfere with the breaking of the fracturing fluid. For example, the presence of the activator can be inert to the breaking of the fracturing fluid.

In a gravel pack or frac pack situation, when the gravel pack fluid and/or frac pack fluid is broken, the proppant (or "gravel") remains behind a gravel pack screen, while the broken gravel pack fluid and/or frac pack fluid flows back into the wellbore. The screen works essentially as a filter, leaving the consolidated proppant pack on one side and allowing the broken gravel pack fluid and/or frac pack fluid to flow to the other.

The consolidated proppant pack can be utilized in a gravel pack region or frac pack region of any suitable type of well. In one or more exemplary embodiments, the consolidated proppant pack can be utilized in a gravel pack region or frac pack region of one or more of offshore oil and/or gas wells, onshore oil and/or gas wells, geothermal wells, water wells, waste disposal wells, or water-injection wells. In the case of water injection wells, the consolidated proppant pack must have sufficient annular and fracture conductivity to minimize pressure drop over the pack during water injection and, at the same time, sufficient annular strength to prevent mobilization of the proppant and washouts under the water injection conditions that can exceed 1,250,000 gallons of water per day. In one or more exemplary embodiments, the consolidated proppant pack has suitable strength and conductivity to withstand about 500,000, about 1,000,000, or about 1,200,000 to about 1,250,000, about 1,500,000, or about 2,000,000 gallons of water per day under the formation fracture pressure or the pressure above which injection of fluids will cause the subterranean formation to fracture hydraulically, flowing therethrough.

According to several exemplary embodiments of the present invention, a method for the hydraulic fracturing of a subterranean formation is provided. According to several exemplary embodiments of the present invention, a propped fracture is provided wherein a plurality of unconsolidated resin-coated proppant particulates reside in at least a portion of the fracture. In accord with several exemplary embodiments of the present invention, an activator is introduced into the propped fracture. Suitable activators are detailed above. When the activator is introduced into the propped fracture, it contacts the resin-coated proppant particulates. In several exemplary embodiments of the present invention, a consolidated proppant pack is formed as a result of the contact between the resin-coated proppant particulates and the activator. In several exemplary embodiments of the present invention, the resin-coated proppant particulates are consolidated by either physical or chemical bonding, or combinations thereof.

According to several exemplary embodiments of the present invention, the consolidated proppant pack can be formed in-situ under wellbore conditions. For example, the consolidated proppant pack can be formed by contacting the resin-coated proppant particulates with the activator under a temperature of about 160° F., about 170° F., about 180° F., about 185° F., or about 190° F. to about 195° F., about 200° F., about 205° F., about 210° F., about 225° F., or about 250° F. According to several exemplary embodiments of the present invention, the consolidated proppant pack can be formed by contacting the resin-coated proppant particulates with the activator under a pressure of about 0.01 psi, about 0.5 psi, about 1 psi, about 5 psi, about 10 psi, or about 25 psi to about 35 psi, about 45 psi, about 50 psi, or about 100 psi. According to other exemplary embodiments of the present invention, the consolidated proppant pack can be formed by contacting the resin-coated proppant particulates with the activator under a pressure of about 10 psi, about 50 psi, about 100 psi, about 250 psi, about 500 psi, or about 750 psi to about 1,000 psi, about 1,500 psi, about 2,000 psi, or about 5,000 psi. For example, the consolidated proppant pack can be formed by contacting the resin-coated proppant particulates with the activator under a temperature of about 165° F. to about 230° F., about 175° F. to about 220° F., about 193° F. to about 215° F., or about 197° F. to about 207° F. and a pressure of about 2 psi to about 75 psi, about 5 psi to about 60 psi, about 15 psi to about 50 psi, about 100 psi to about 1,000 psi, or about 500 psi to about 5,000 psi.

According to several exemplary embodiments of the present invention, the proppant pack will remain unconsolidated until it is at least partially contacted by the activator. The consolidated proppant pack can have a Unconfined Compressive Strength (UCS) of at least about 4 psi, at least about 8 psi, at least about 20 psi, at least about 40 psi, at least about 60 psi, at least about 80 psi, at least about 100 psi, at least about 120 psi, at least about 150 psi, or at least about 200 psi under a pressure of about 0.01 psi to about 50 psi and a temperature of about 160° F. to about 250° F. The consolidated proppant pack can have a UCS of about 1 psi, about 5 psi, about 10 psi, about 25 psi, about 35 psi, about 50 psi, about 60 psi, about 75 psi, about 85 psi, or about 95 psi to about 100 psi, about 120 psi, about 150 psi, about 175 psi, about 200 psi, about 225 psi, about 250 psi, or about 500 psi under a pressure of about 0.01 psi, about 0.5 psi, about 1 psi, about 5 psi, about 10 psi, or about 25 psi to about 35 psi, about 45 psi about 50 psi, or about 100 psi and a temperature of about 160° F., about 170° F., about 180° F., about 185° F., or about 190° F. to about 195° F., about 200° F., about 205° F., about 210° F., about 225° F., or about 250° F. A consolidated proppant pack formed from a fracturing fluid containing from about 0.01 wt % to about 0.5 wt % of an activator can have a UCS of about 10 psi to about 100 psi or from about 25 psi to about 75 psi. A consolidated proppant pack formed from a fracturing fluid containing from about 0.6 wt % to about 1.4 wt % of an activator can have a UCS of about 100 psi to about 250 psi or from about 115 psi to about 220 psi. A consolidated proppant pack formed from a fracturing fluid containing from about 1.5 wt % to about 2.5 wt % of an activator can have a UCS of about 250 psi to about 400 psi or from about 300 psi to about 350 psi.

According to several exemplary embodiments of the present invention, a proppant composition can form a consolidated proppant pack after the proppant composition has been subjected to storage conditions of temperatures of up to 150° F., up to 100° F., and up to 50° F. and atmospheric pressure from about one month to about eighteen months. For example, a proppant composition subjected to storage conditions of temperatures of up to 150° F., up to 100° F., and up to 50° F. and atmospheric pressure from about one month to about eighteen months can form a consolidated proppant pack having a UCS the same as or substantially similar to a consolidated proppant pack formed from a proppant composition that has not been subjected to storage conditions.

According to several exemplary embodiments of the present invention, the consolidated proppant pack can be contacted with or flushed with any suitable gel-breaker material, such as metal halide salts. For example, the gel-breaker material can include lithium chloride (LiCl), sodium chloride (NaCl), potassium chloride (KCl), rubidium chloride (RbCl), or cesium chloride (CsCl), or any mixtures or combinations thereof. Contacting the consolidated proppant pack with a gel-breaker material can increase the UCS of the consolidated proppant pack by at least about 5%, at least about 10%, at least about 20%, at least about 30%, or at least about 35%.

Further, pursuant to the present invention, a prepacked screen is provided. According to several exemplary embodiments of the present invention, a prepacked screen is provided wherein a plurality of unconsolidated resin-coated proppant particulates reside within at least a portion of the screen prior to placement of the screen downhole. The activator can be introduced into the resin-coated proppant containing prepacked screen. Suitable activators are detailed above. According to one or more exemplary embodiments, when the activator contacts the resin-coated proppant particulates, a crosslinking reaction occurs between adjacent proppant particulates, which in turn then form a consolidated proppant pack within the prepacked screen assembly. In several exemplary embodiments of the present invention, the resin-coated proppant particulates are consolidated by either physical or chemical bonding, or combinations thereof.

FIG. 1 depicts a perspective view of an illustrative gravel pack assembly 100 containing a consolidated proppant pack 110. As shown in FIG. 1, the gravel pack assembly 100 can include a casing 102 and a tubular 104. The tubular 104 can be axially aligned within the casing 102, resulting in an annular space 112 situated between the tubular 104 and the casing 102. The tubular 104 can have a perforated section (not shown) and at least a portion of the perforated section can be surrounded by a screen 106. For example, the screen 106 can be circumferentially disposed about the perforated section and axially aligned with tubular 102. The consolidated proppant pack 110 can be at least partially located in the annular space 112, between the screen 106 and the casing 102. The casing 102 can include one or more perforations (not shown) for providing fluid communication between a surrounding subterranean environment and the consolidated proppant pack 110. The gravel pack assembly 100 can be located in any suitable vertical or horizontal wellbore. A longitudinal axis of the gravel pack assembly 100 can have any suitable orientation with respect to vertical. For example, the longitudinal axis of the tubular 104 can be substantially vertically oriented or substantially horizontally oriented. In one or more exemplary embodiments, the gravel pack assembly 100 can be located in a vertical portion, deviated portion, and/or horizontal portion of wellbore. In one or more exemplary embodiments, two or more gravel pack assemblies 100 can be located in a single wellbore. In one or more exemplary embodiments, the wellbore can be an openhole, or uncased, wellbore (not shown). For example, the consolidated proppant pack 110 can be positioned in an openhole wellbore (not shown) and the consolidated proppant pack 110 can be disposed adjacent to and/or in contact with the surrounding subterranean environment.

Figure 2:
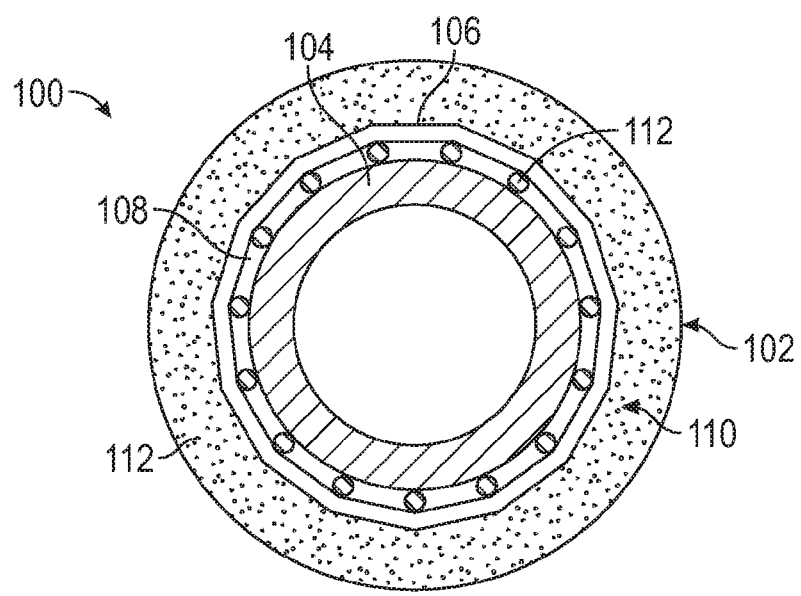
FIG. 2 depicts a cross-sectional view of the prepack screen taken along line 1-1 of FIG. 1.

FIG. 2 depicts a cross-sectional view of the gravel pack assembly 100 taken along line 1-1 of FIG. 1. As shown in FIG. 2, a second annulus 108 can be formed between the tubular 104 and the screen 106. A plurality of longitudinally arranged rods 112 can be disposed about the consolidated tubular 104 such that the screen 106 is at least partially offset from the tubular 104. The rods 112 can be spaced apart from one another and arranged coaxially with the tubular 104. The screen 106 can be wrapped around the rods 112 and welded to the tubular 102.

Figure 3:
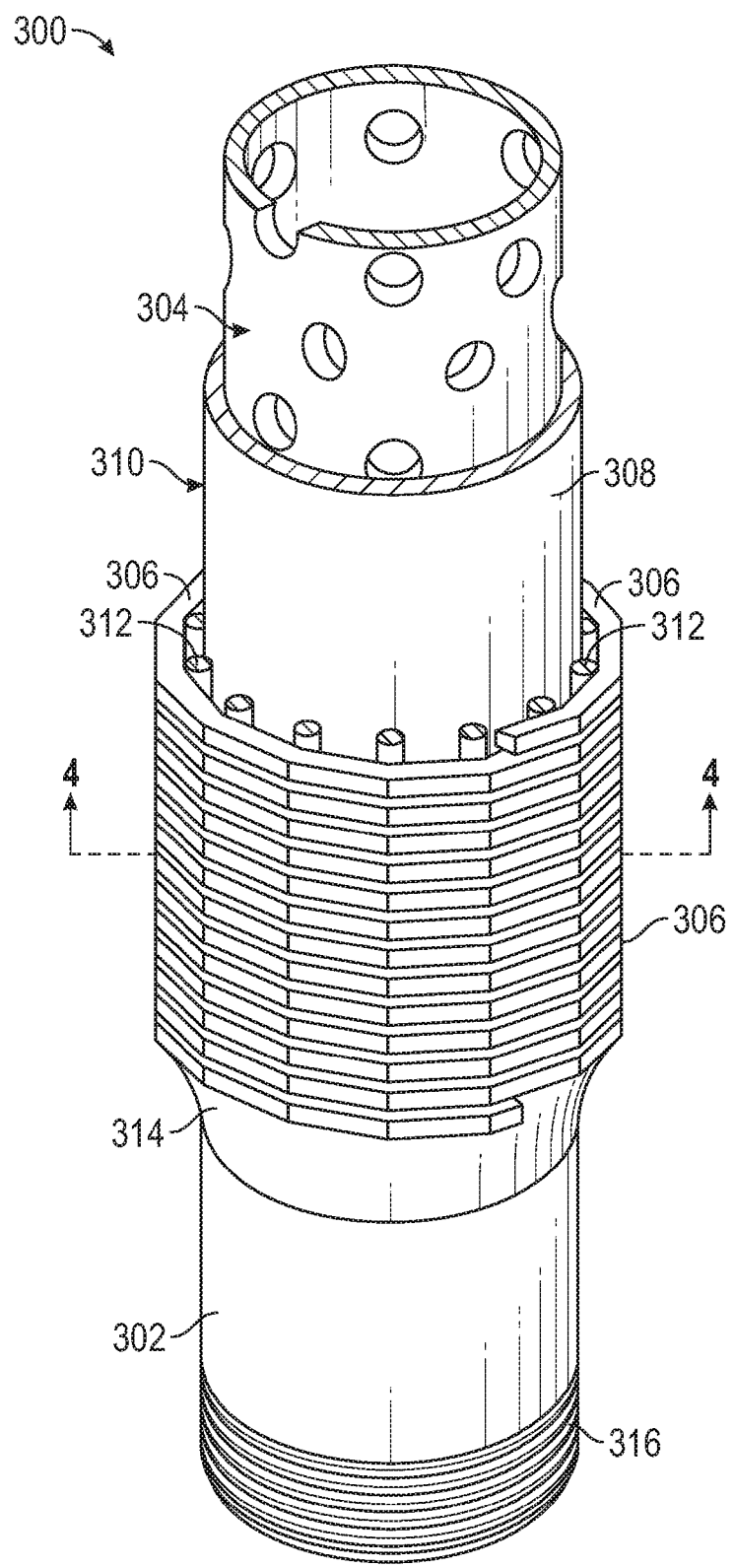
FIG. 3 depicts a perspective view of an illustrative prepack screen assembly containing a proppant pack, according to several exemplary embodiments of the present invention.
Figure 4:
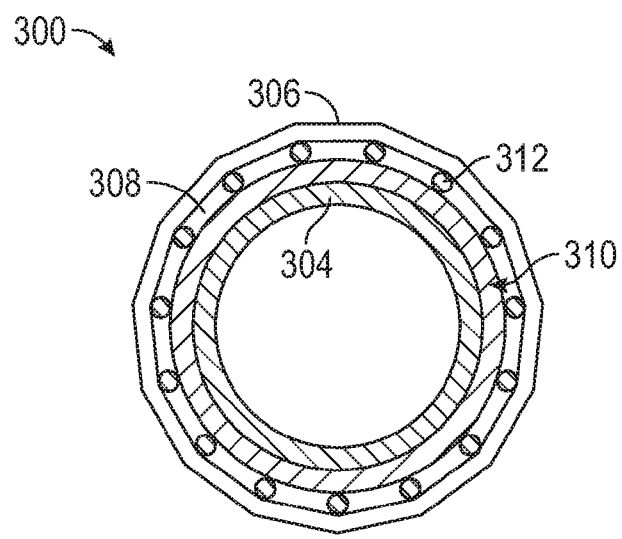
FIG. 4 depicts a cross-sectional view of the prepack screen taken along line 3-3 of FIG. 3.
Figure 5:
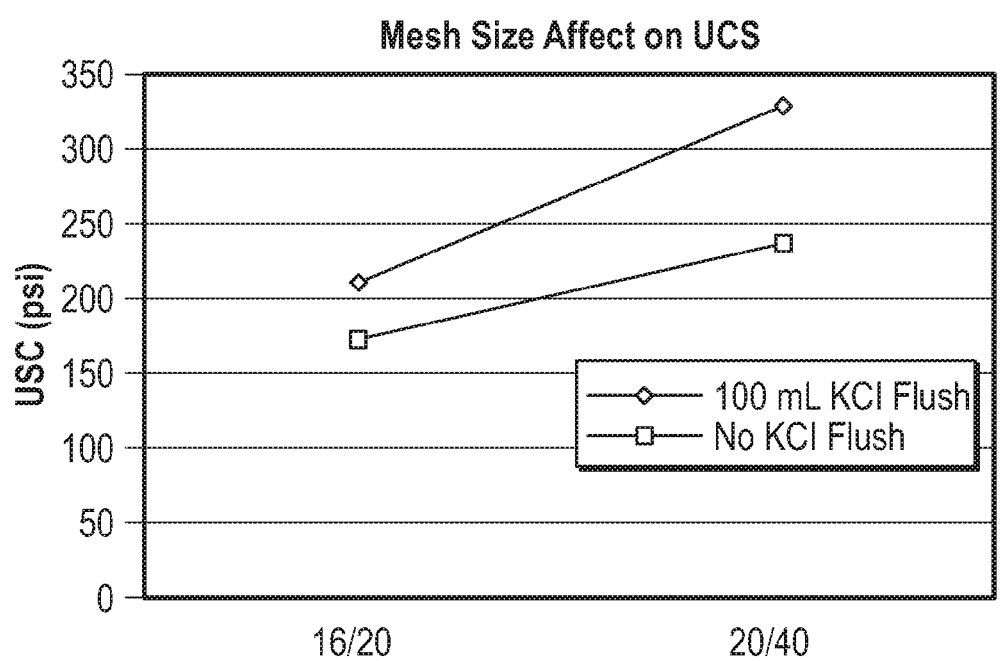
FIG. 5 depicts a graphical representation showing the effect of proppant size on Unconfined Compressive Strength (UCS).
Figure 6:
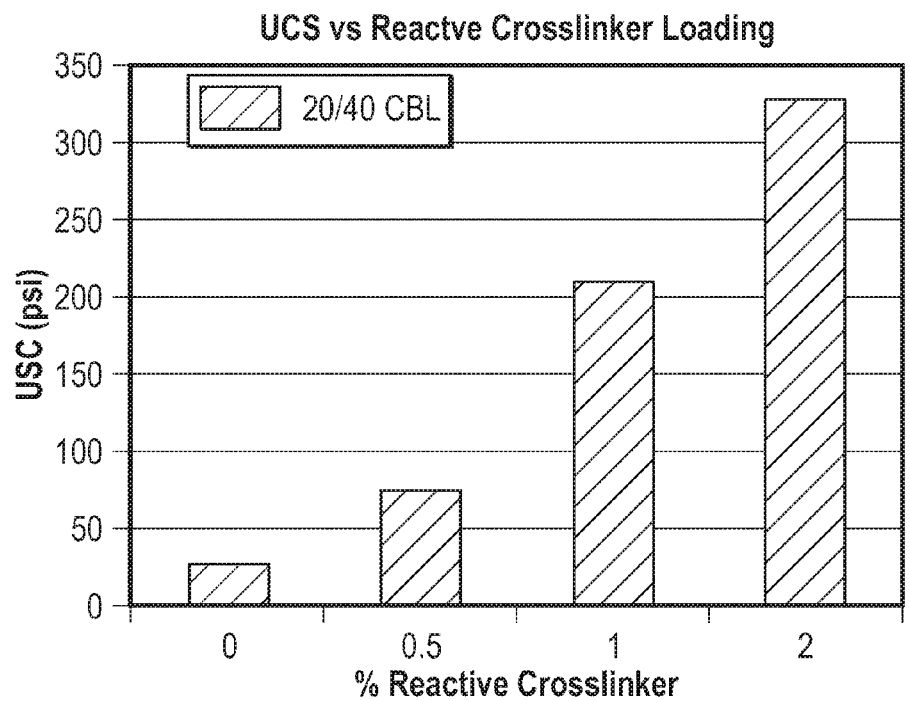
FIG. 6 depicts a graphical representation showing the effect of activator concentration on Unconfined Compressive Strength (UCS).

FIG. 3 depicts a perspective view of an illustrative prepack screen assembly 300 containing a consolidated proppant pack 310. As shown in FIG. 3, the prepack screen assembly 300 can include a tubular 302 having a perforated section 304. At least a portion of the perforated section 304 can be surrounded by a screen 306. For example, the screen 306 can be circumferentially disposed about the perforated section 304 and axially aligned with tubular 302. An annulus 308 can be formed between the tubular 302 and the screen 306. A consolidated proppant pack 310 can be disposed between the tubular 302 and the screen 306, in the annulus 308. A plurality of longitudinally arranged rods 312 can be disposed about the consolidated proppant pack 310 such that the screen 306 is at least partially offset from the consolidated proppant pack 310. The rods 312 can be spaced apart from one another and arranged coaxially with the tubular 302. The screen 306 can be wrapped around the rods 312 and welded to the tubular 302 via welds 314. The tubular 302 can include a threaded portion 316 on at least one end thereof for connecting the prepack screen assembly 300 to production tubing (not shown), for example. FIG. 4 depicts a cross-sectional view of the prepack screen taken along line 4-4 of FIG. 3. Examples of prepack screen assemblies can be found in U.S. Pat. Nos. 4,487,259 and 5,293,935, the entire disclosures of which are incorporated herein by reference.

The consolidated proppant pack 310 can be consolidated before, during, or after inclusion of the proppant particulates in the annulus 308. For example, loose, unconsolidated resin-coated proppant particulates can be introduced to the annulus 308 of the prepack screen assembly 300. After introduction of the resin-coated proppant particulates to the annulus 308, the activator can contact the resin-coated proppant particles to produce the consolidated proppant pack 310. After completion of the prepack screen assembly 300 at the surface, the pre-pack assembly 300 can be lowered downhole to a desired depth.

Further, pursuant to the present invention, a remedial workover procedure (not shown) for replacement of a gravel pack screen assembly is provided. According to several exemplary embodiments of the present invention, a gravel pack screen located downhole in a gravel pack region of a wellbore is removed from the wellbore with a downhole tool. After removal of the screen, a plurality of unconsolidated resin-coated proppant particulates in a fracturing fluid, gravel pack fluid, and/or frac pack fluid can be placed in the gravel pack region. The activator in the fluid then contacts the resin-coated proppant particulates, causing a crosslinking reaction between adjacent proppant particulates, which in turn then form a consolidated proppant pack within the gravel pack region, forming a plug in the wellbore to block fluid communication between the subterranean formation and the surface. In several exemplary embodiments of the present invention, a drill is then lowered into the wellbore to drill a borehole within the consolidated proppant pack plug and to reestablish fluid communication with the subterranean formation.

Other exemplary embodiments include injecting and consolidating the proppant in caverns or voids located behind a casing that can extend into a formation, injecting and consolidating the proppant into shallow, low-pressure well fractures, and placing zonal isolation plugs formed from the consolidated proppant. Other exemplary embodiments can also include forming and placing the consolidated proppant into and/or around perforations through a well casing to provide filtration and sand control for fluid flow through the perforations that provide fluid communication between the formation and the wellbore.

The following examples are illustrative of the compositions and methods discussed above.

EXAMPLES

Several commercially available water dispersible epoxy resins are listed in Table 1. These water dispersible epoxy resins are representative of the class of epoxy resins that may be suitable for use as an activator in several exemplary embodiments of the present invention, but are not intended to be exhaustive.

TABLE 1

| Sample Name | Composition |
|---|---|
| Ancarez AR555 Epoxy Resin (available from Air Products and Chemicals, Inc.) | Oxirane, 2,2,'-[(1-methylethylidene)bis(4,1-phenyleneoxymethylene)]bis-homopolymer (50-60%) Water (40-50%) |
| Ancarez AR462 Resin (available from Air Products and Chemicals, Inc.) | Bisphenol A diglycidyl ether resin (55-65%) Water (35-45%) |
| D.E.R. 916 Epoxy Resin (available from Dow Chemical) | Modified, semi-solid, epoxy novolac resin Reaction product of phenol-formaldehyde novolac with epichlorohydrin emulsified in water |
| XZ 92598.00 Experimental Liquid Epoxy Resin Emulsion (available from Dow Chemical) | Propane, 2,2-bis[p-(2,3-epoxypropoxy)phenyl]-,polymers (40-60%) Water (20-40%) Nonionic surfactant (<10%) |
| D.E.R. 3913 Epoxy Resin (available from Dow Chemical) | Modified epoxy resin (30-50%); Propane, 2,2-bis[p-(2,3-epoxypropoxy)phenyl]-,polymers (25-45%), Reaction product: Bisphenol F-(epichlorhydrin) (<15%); Alkyl ($C_{12-14}$) glycidyl ether (<10%) |

The experiments described below were carried out using exemplary materials in order to determine the compatibility of the epoxy resins with fracturing fluids. These experiments are meant to be illustrative of exemplary embodiments of the present invention and are not intended to be exhaustive.

Fracturing Fluid Compatibility Testing

According to several exemplary embodiments of the present invention, an activator is injected into a fracture, gravel pack or frac pack along with a fracturing fluid in order to contact resin-coated proppant particulates residing in the fracture, gravel pack or frac pack. Therefore, according to such embodiments, it is desirable that the activator is compatible with, or has minimal chemical interaction with, the fracturing fluid so that the activator retains its activity until it reaches the resin-coated proppant particulates residing in the fracture, gravel pack or frac pack. Accordingly, four epoxy resin samples were tested for their compatibility with a fracturing fluid.

First, a fracturing fluid was prepared by weighing out 1500 g of deionized water into a 2 L beaker. To provide gel clean-up, 30.0 g of KCl was added to the water using an overhead stirrer and was mixed until completely dissolved. 7.2 g of guar gum, a thickening agent, was then slowly added to the vortex and the pH of the solution was adjusted (with 1N HCl or NaOH as necessary) to reach a pH of between 5-7. The mixture was then stirred for 15 minutes. The fracturing fluid was then allowed to hydrate for at least four hours by allowing the fracturing fluid to sit quiescent at ambient temperature. After hydration, the pH of the fracturing fluid was adjusted to 10.1-10.5 with 1N NaOH to condition the fluid as necessary.

Four activators were then labeled "AR555", "AR462", "DER 916", and "DER 3913" to represent the epoxy dispersions listed in Table 1, and 500 g of the fracturing fluid was placed into each beaker. 5.0 g of each epoxy dispersion (or 1% by weight) was added to the appropriate activator and the components were mixed. Then, 200.0 g of each fracturing fluid/dispersion mixture was placed into a blender jar and was blended until a vortex formed. Next, 0.12 g of ammonium peroxydisulfate, ALS grade 98% minimum, which is commercially available from Alfa Aesar®, was added to the blender to function as a fracturing fluid breaker. The mixtures were stirred for 15 seconds. Then, 192.0 g of CARBOBOND® LITE® 20/40 resin-coated lightweight ceramic proppant which is commercially available from CARBO Ceramics, Inc. was added to the mixtures and stirred until a vortex is formed. Finally, 0.1 g of sodium tetraborate pentahydrate fracturing fluid crosslinker, which is commercially available from Fritz Industries®, was added to the mixtures.

The samples were heated on a hotplate to approximately 180° F. with an overhead stirrer in order to break the fracturing fluid. The samples were then placed in a water bath heated to 194° F. for 90 minutes. After 90 minutes, the samples were allowed to cool to room temperature and the broken fracturing fluid was decanted off the proppant particulates. A viscosity measurement of the samples was then taken using a Fann Model 35A viscometer with a B-2 bob. A viscosity of less than 20 cP at room temperature is considered to indicate that the activator is compatible with the fracturing fluid. Table 2 summarizes the viscosity results for the four prepared samples.

TABLE 2

| Sample | Viscosity at Room Temperature (cP) | pH | Temperature (° F.) |
|---|---|---|---|
| Ancarez AR555 Epoxy Resin | 2.5 | 9 | 75 |
| Ancarez AR462 Resin | 2.5 | 9 | 75 |
| D.E.R. 916 Epoxy Resin | 2.5 | 9 | 75 |
| D.E.R. 3913 Epoxy Resin | 2.5 | 9 | 75 |

A second experiment was performed using the above procedure, except that the composition included 2% by weight of the epoxy dispersion (10.0 g added to 500 g of fracturing fluid). According to this experiment, Ancarez AR555 Epoxy Resin, Ancarez AR462 Resin, D.E.R. 916 Epoxy Resin, and epoxy resin emulsion XZ 92598.00 Experimental Liquid Epoxy Resin, commercially available from Dow Chemical, were tested. Table 3 summarizes the viscosity results for these four samples.

TABLE 3

| Sample | Viscosity at Room Temperature (cP) | pH | Temperature (° F.) |
|---|---|---|---|
| Ancarez AR555 Epoxy Resin | 2.5 | 9 | 75 |
| Ancarez AR462 Resin | 2.5 | 9 | 75 |
| D.E.R. 916 Epoxy Resin | 2.5 | 9 | 75 |
| XZ 92598.00 Experimental Liquid Epoxy Resin Emulsion | 2.5 | 9 | 75 |

UCS Testing (Using 40 Pounds of Borate-Crosslinked Fracturing Fluid)

The experiments described below were performed with exemplary materials in order to determine the UCS of certain resin-coated proppants after consolidation. These experiments are meant to be illustrative of exemplary embodiments of the present invention and are not intended to be exhaustive. These experiments were designed to simulate actual downhole conditions.

Four fracturing fluid proppant samples which included 1% by weight of the epoxy dispersion were prepared using the procedure described above, except that the fracturing fluid was not decanted from the proppant particulates. A proppant slug of each of the four samples (Ancarez® AR555 Epoxy Resin, Ancarez® AR462 Resin, D.E.R.™ 916 Epoxy Resin, and D.E.R.™ 3913 Epoxy Resin) was loaded into the metallic cylinder of a UCS cell and the fracturing fluid was broken. The bottom valves of the UCS cells were closed, but the top valves were left open to simulate a zero stress environment. The proppant slugs were not rinsed. The UCS cells were placed in an oven at 200° F. for 64 hours. After 64 hours, the UCS cells were removed from the oven and the proppant slugs were placed in a desiccator to dry overnight. The resultant proppant slugs were prepared for testing by filing the edges perpendicular to the sides. The slugs were then crushed using an Admet Universal Testing Machine with Dual Column, model eXpert 2600, with a 2000 pound load cell. The proppant slugs were subjected to a compressive load at a rate of 0.1 in/min and the UCS is the measurement of the compressive load at the point of breakage divided by the area of the proppant slug. Table 4 summarizes the results of the UCS test on the four prepared samples.

TABLE 4

| Sample | UCS, psi (Zero Stress, 200° F.) |
| --- | --- |
| Ancarez AR555 Epoxy Resin | 20 |
| Ancarez AR462 Resin | 20 |
| D.E.R. 916 Epoxy Resin | 29 |
| D.E.R. 3913 Epoxy Resin | 60 |

A second UCS experiment was conducted, except that the compositions included 2% by weight of the epoxy dispersion. According to this experiment, Ancarez AR555 Epoxy Resin, Ancarez AR462 Resin, D.E.R. 916 Epoxy Resin, and epoxy emulsion XZ92598 Experimental Liquid Epoxy Resin Emulsion were tested. Table 5 summarizes the results of the UCS test on the four samples.

TABLE 5

| Sample | UCS, psi (Zero Stress, 200° F.) | Length (in.) | Typical length under UCS conditions at 1000 psi |
| --- | --- | --- | --- |
| Ancarez AR555 Epoxy Resin | 70 | 3.25 | 2.12-2.25 |
| Ancarez AR462 Resin | 201 | 3.25 | 2.12-2.25 |
| D.E.R. 916 Epoxy Resin | 57 | 3.25 | 2.12-2.25 |
| XZ 92598.00 Experimental Liquid Epoxy Resin Emulsion | 117 | 3.25 | 2.12-2.25 |

UCS Testing (Using 80 Pounds of HEC Fracturing Fluid)

A UCS experiment was conducted using D.E.R. 3913 Epoxy Resin in 80 pounds of HEC (Hydroxyethylcellulose) fracturing fluid. The 80 pounds of HEC fracturing fluid was prepared by weighing out 1000 g of deionized water into a 2 L beaker. 24 mL of the HEC concentrated suspension was added to the water using an overhead stirrer and was mixed until completely dissolved. The pH was then adjusted to a pH of 8-9 with 1N NaOH. The solution was allowed to reach full viscosity within a minute or two with constant stirring. Next, 15 mL of Vicon NF, a fracturing fluid that is commercially available from Halliburton Energy Services, Inc., was added to act as a fracturing fluid breaker. 20.0 mL of D.E.R. 3913 Epoxy Resin (or 2% by volume) was added to the fracturing fluid to act as an activator. 66.0 g of CARBOBOND LITE 20/40 resin-coated lightweight ceramic proppant which is commercially available from CARBO Ceramics, Inc., was added to a clean beaker. 80 mL of the prepared fracturing fluid was added. Using an overhead stirrer, the proppant/fluid mixture was mixed for 1 minute. The proppant/fluid mixture was then transferred to a UCS cell and the fracturing fluid was drained out through the bottom valve. The valves on the UCS cells were left open to simulate a zero stress environment. The unpressurized UCS cell was then placed in an oven set at 200° F. for 24 hours. A second set of UCS experiments was repeated using the same procedure above but with a 2% KCl rinse. After the proppant/fluid mixture was transferred to a UCS cell and the fracturing fluid drained out, the proppant pack in the UCS cell was flushed with 2% KCl (in deionized water). The unpressurized UCS cell was then placed in an oven set at 200° F. for 24 hours. After 24 hours, the cells were removed from the oven, the proppant slugs were removed from the UCS cell and the proppant slugs were allowed to cool and dry for at least 24 hours. The resultant proppant slugs were prepared for testing by filing the edges perpendicular to the sides. The slugs were then crushed using an Admet Universal Testing Machine with Dual Column, model eXpert 2600, with a 2000 pound load cell. The proppant slugs were subjected to a compressive load at a rate of 0.1 in/min and the UCS is the measurement of compressive load at the point of breakage divided by the area of the proppant slug. Unexpectedly, the 2% KCl rinse increased the UCS of the sample. Table 6 summarizes the results of the UCS test on these prepared samples.

TABLE 6

| Sample | Proppant Type | KCl Rinse (mL) | UCS, psi (Zero Stress, 200° F.) |
| --- | --- | --- | --- |
| D.E.R 3913 Epoxy Resin | CARBOBOND LITE20/40 | 0 | 237 |
| D.E.R. 3913 Epoxy Resin | CARBOBOND LITE 20/40 | 100 | 328 |

A third set of UCS experiments using the 80 pound HEC Fracturing Fluid was conducted on CARBOBOND LITE 16/20 resin-coated lightweight ceramic proppant which is commercially available from CARBO Ceramics, Inc. in a similar manner as mentioned above. Table 7 summarizes the results of the UCS test on these prepared samples. The KCL rinse also increased the UCS of the sample.

TABLE 7

| Sample | Proppant Type | KCl Rinse (mL) | UCS, psi (Zero Stress, 200° F.) |
| --- | --- | --- | --- |
| D.E.R. 3913 Epoxy Resin | CARBOBOND LITE 16/20 | 0 | 172 |
| D.E.R. 3913 Epoxy Resin | CARBOBOND LITE 16/20 | 100 | 210 |

The effect of the size of the proppant particulates on UCS strength is shown in FIG. 3. The reduction in UCS strength when going from proppant with a mesh size distribution between 20/40 to proppant with a mesh size distribution between 16/20 is observed. This result is expected due to the reduced points of contact that result from larger particles.

Despite the increase in proppant size, the 16/20 mesh proppant still exhibits relatively high UCS strength.

A fourth set of UCS experiment using the 80 pound HEC Fracturing Fluid was conducted on CARBOBOND LITE 20/40 resin-coated lightweight ceramic proppant, which is commercially available from CARBO Ceramics, Inc., in a similar manner as mentioned above but with different activator loadings (0 vol %, 0.5 vol %, 1 vol % and 2 vol %). The plot shown in FIG. 4 summarizes the results of the UCS test on these prepared samples.

130° F. Storage Stability Test

In order to test whether or not the resin-coated proppant particulates would consolidate or the finished properties would change under elevated storage conditions in the absence of an activator, samples of CARBOBOND LITE 20/40 resin-coated lightweight ceramic proppant, which is commercially available from CARBO Ceramics, Inc., were heated in an oven set at 130° F. for a duration of one month. A weekly sample was then removed from the oven, allowed to equilibrate to room temperature, residual cure and UCS were then determined. Table 8 summarizes the results of these tests on the prepared samples.

TABLE 8

| Time (week) | Results |
|---|---|
| 0 | Baseline |
| 1 | No change from Baseline |
| 2 | No change from Baseline |
| 3 | No change from Baseline |
| 4 | No change from Baseline |

140° F. Extended Storage Stability Test

In order to test whether or not the resin-coated proppant particulates would consolidate or the finished properties would change under elevated storage conditions in the absence of an activator, samples of CARBOBOND LITE 20/40 resin-coated lightweight ceramic proppant, which is commercially available from CARBO Ceramics, Inc., were heated in an oven set at 140° F. for a duration of 365 days. Samples were periodically removed from the oven, allowed to equilibrate to room temperature, and UCS at 250° F. and closure stress of 1000 psi was then determined. The samples maintained a UCS of about 1,010 psi for about 365 days and possessed a UCS ranging from about 950 psi to about 1,010 psi for about the last 100 days of the 365 day test.

Cure Kinetics

In order to determine the working time or the time it takes the proppant/fluid mixture to reach a viscosity where it becomes unworkable, samples of CarboBond®Lite® 20/40 resin-coated lightweight ceramic proppant, which is commercially available from CARBO Ceramics, Inc., were exposed to an 80 pound HEC fluid with 1.5% Vicon NF (breaker) and 2% D.E.R.™ 3913 Epoxy Resin (activator) at 100° F., 130° F., 150° F., 175° F. and 200° F. Samples were then removed at different time points and the UCS was determined. Table 9 summarizes the results of these tests on the prepared samples.

TABLE 9

| Temperature | Working Life (hr) |
|---|---|
| 100° F. | 24-48 |
| 130° F. | 12-18 |

TABLE 9-continued

| Temperature | Working Life (hr) |
|---|---|
| 150° F. | 3-4 |
| 175° F. | 1.5-2 |
| 200° F. | 1-1.5 |

The data in Table 9 shows that the proppant/fluid mixture remains flowable/pumpable for up to 1.5 hr, 1.5-2 hr, 3-4 hr, 12-18 hr and 24-48 hr at 200° F., 175° F., 150° F., 130° F. and 100° F., respectively.

Consolidation Test

In order to test whether or not the resin-coated proppant particulates would consolidate under wellbore conditions in the absence of an activator, three fracturing fluid proppant samples which contained 1% by weight of the epoxy dispersion of Ancarez® AR555 Epoxy Resin, Ancarez® AR462 Resin and D.E.R.™ 916 Epoxy Resin were prepared. The samples were prepared using the procedure outlined above. The samples were taken after 0.12 g of the peroxydisulfate breaker was added to the mixture. The hot plate procedures were not used to avoid breaking the fracturing fluid.

A proppant slug sample that included the Ancarez® AR555 Epoxy Resin, Ancarez® AR462 Resin and D.E.R™ 916 Epoxy Resin epoxy dispersions were placed into glass jars and heated to 200° F. for 48 hours. After 48 hours, the proppant was observed for consolidation. Table 10 summarizes the results of the consolidation tests.

TABLE 10

| Sample | Observation |
|---|---|
| Ancarez ® AR555 Epoxy Resin | Unconsolidated |
| Ancarez ® AR462 Resin | Unconsolidated |
| D.E.R. ™ 916 Epoxy Resin | Unconsolidated |

This data shows that the proppant samples remained unconsolidated in the presence of unbroken fracturing fluid, indicating that the resin-coated proppant particulates will remain unconsolidated under wellbore conditions.

Activator and Borate Crosslinker Compatibility

Figure 7:
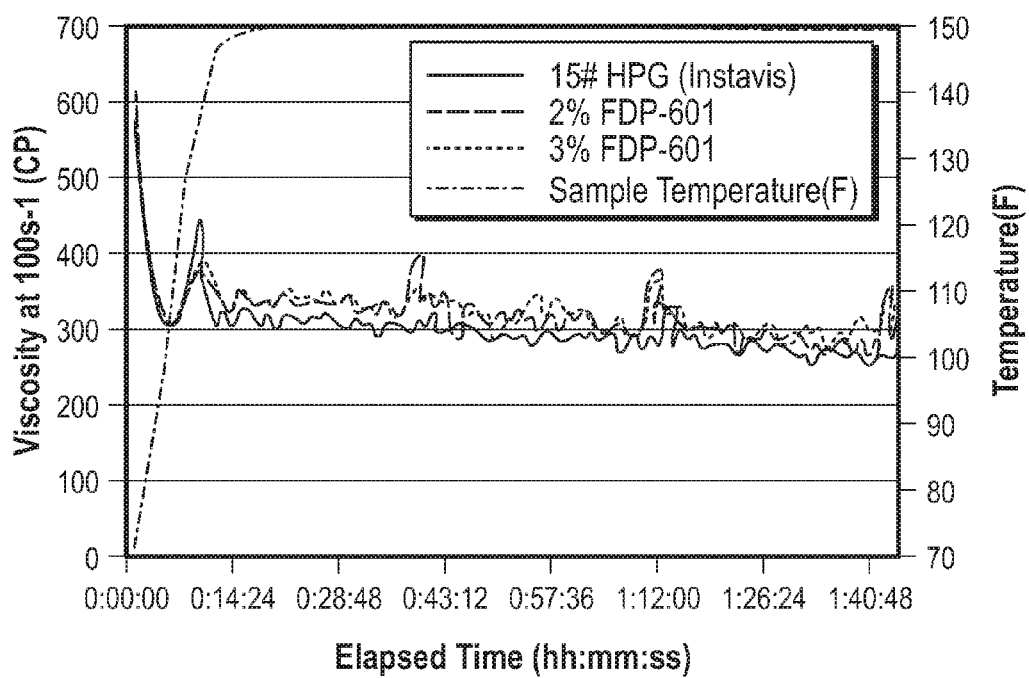
FIG. 7 depicts a graphical representation showing the effect of the addition of activator to cross-linked gel on a rheology profile of the cross-linked gel.

In order to test whether or not a borate crosslinker would be compatible with an activator, two fracturing fluid samples in which contained 2 and 3% FDP-601 activator were run on a Chandler HPTP Viscometer Model 5550 and were compared to the base cross-linked InstaVis™ gel. InstaVis is a fracturing fluid that is commercially available from Halliburton Energy Services, Inc. The FDP-601 activator is a two component blend of D.E.R. 3913 and D.E.R. 732. FIG. 7 depicts a graphical representation showing the effect of the addition of the FDP-601 activator to cross-linked gel on a rheology profile of the cross-linked gel. As shown in FIG. 7, the addition of the FDP-601 activator to the cross-linked gel at 2-3% does not affect the rheology profile of the cross-linked gel.

Exemplary embodiments of the present disclosure further relate to any one or more of the following paragraphs:

1. A method of gravel packing a wellbore, the method comprising: mixing an activator, a thickener, a crosslinker, and a plurality of resin-coated proppant particulates to provide a gravel pack fluid; introducing the gravel pack fluid into a gravel pack region of the wellbore; and consolidating at least a portion of the plurality of resin-coated proppant particulates to provide a consolidated gravel pack, wherein the consolidated gravel pack has a UCS of at least about 60 psi when formed under a pressure of about 0.01 psi to about 50 psi and a temperature of about 160° F. to about 250° F.

2. The method according to paragraph 1, wherein the gravel pack fluid is obtained by: providing an aqueous solution containing a breaker, the activator and the thickener; mixing the plurality of resin-coated proppant particulates with the aqueous solution to provide a slurry; and adding the crosslinker to the slurry to provide the gravel pack fluid.

3. The method according to paragraph 1, wherein the gravel pack fluid is obtained by: providing a slurry containing the plurality of resin-coated proppant particulates; mixing the activator with the slurry to provide an activated slurry; and adding the crosslinker to the activated slurry to provide the gravel pack fluid.

4. The method according to paragraph 1, wherein the gravel pack fluid is obtained by: providing an aqueous solution containing a breaker, the activator and the thickener; mixing the crosslinker with the aqueous solution to provide a base fluid; and adding the plurality of resin-coated proppant particulates to the base fluid to provide the gravel pack fluid.

5. The method according to any one of paragraphs 1 to 4, wherein the activator is selected from the group consisting of D.E.R. 3913, D.E.R. 732, and D.E.R. 736 and any mixture thereof.

6. The method according to any one of paragraphs 1 to 5, wherein the thickener is selected from the group consisting of guar, guar gum, xanthan gum, locust bean gum, hydroxypropyl guar, carboxymethyl guar, carboxymethylhydroxypropyl guar, starches, polysaccharides, alginates, HEC, ethylcellulose, methylcellulose, sodium carboxymethylcellulose, hydroxypropylcellulose, and hydroxyethylcellulose, and polyacrylamides and any combination thereof.

7. The method according to any one of paragraphs 1 to 6, wherein the crosslinker comprises boron, zirconium, titanium, chromium, iron, or aluminum or any combination thereof.

8. The method according to any one of paragraphs 1 to 6, wherein the crosslinker is a delayed crosslinker.

9. The method according to any one of paragraphs 1 to 8, wherein the gravel pack fluid further comprises a buffer that delays crosslinking of the thickener for about 30 seconds to about 5 minutes.

10. The method according to any one of paragraphs 1 to 9, wherein the proppant particulates are selected from the group consisting of a lightweight ceramic proppant, an intermediate strength ceramic proppant, a high strength ceramic proppant, a natural frac sand, a porous ceramic proppant and glass beads.

11. The method according to any one of paragraphs 1 to 10, wherein the crosslinker in the gravel pack fluid increases the viscosity of the gravel pack fluid.

12. The method according to any one of paragraphs 1 to 11, wherein the resin coating comprises an amine-cured novolac resin coating.

13. The method according to paragraph 12, wherein the amine-cured novolac resin comprises a hexamine-cured novolac resin.

14. The method according to paragraph 13, wherein the resin coating comprises residual active amine groups.

15. The method according to any one of paragraphs 1 to 14, wherein the resin coating comprises an epoxy resin coating.

16. The method according to any one of paragraphs 1 to 15, wherein the consolidation of at least of portion of the resin-coated proppant particulates takes place at a temperature of less than 220° F.

17. A method of frac packing a wellbore, the method comprising: mixing an activator, a thickener, a crosslinker, and a plurality of resin-coated proppant particulates to provide a frac pack fluid; introducing the frac pack fluid into a frac pack region of the wellbore and into a fracture of a subterranean formation adjacent to the frac pack region; and consolidating at least a portion of the plurality of resin-coated proppant particulates to provide a consolidated frac pack, wherein the consolidated frac pack has a UCS of at least about 60 psi when formed under a pressure of about 0.01 psi to about 50 psi and a temperature of about 160° F. to about 250° F.

18. The method according to paragraph 17, wherein the frac pack fluid is obtained by: providing an aqueous solution containing a breaker, the activator and the thickener; mixing the plurality of resin-coated proppant particulates with the aqueous solution to provide a slurry; and adding the crosslinker to the slurry to provide the frac pack fluid.

19. The method according to paragraphs 17 or 18, wherein the frac pack fluid is obtained by: providing a slurry containing the plurality of resin-coated proppant particulates; mixing the activator with the slurry to provide an activated slurry; and adding the crosslinker to the activated slurry to provide the frac pack fluid.

20. The method according to any one of paragraphs 17 to 19, wherein the frac pack fluid is obtained by: providing an aqueous solution containing a breaker, the activator and the thickener; mixing the crosslinker with the aqueous solution to provide a base fluid; and adding the plurality of resin-coated proppant particulates to the base fluid to provide the frac pack fluid.

21. The method according to any one of paragraphs 17 to 20, wherein the activator is selected from the group consisting of D.E.R. 3913, D.E.R. 732, and D.E.R. 736 and any mixture thereof.

22. The method according to any one of paragraphs 17 to 21, wherein the thickener is selected from the group consisting of guar, guar gum, xanthan gum, locust bean gum, hydroxypropyl guar, carboxymethyl guar, carboxymethylhydroxypropyl guar, starches, polysaccharides, alginates, mineral oil, HEC, ethylcellulose, methylcellulose, sodium carboxymethylcellulose, hydroxypropylcellulose, and hydroxyethylcellulose, and polyacrylamides and any combination thereof.

23. The method according to any one of paragraphs 17 to 22, wherein the crosslinker comprises boron, zirconium, titanium, chromium, iron, or aluminum or any combination thereof.

24. The method according to any one of paragraphs 17 to 23, wherein the crosslinker is a delayed crosslinker.

25. The method according to any one of paragraphs 17 to 24, wherein the frac pack fluid further comprises a buffer that delays crosslinking of the thickener for about 30 seconds to about 5 minutes.

26. The method according to any one of paragraphs 17 to 25, wherein the proppant particulates are selected from the group consisting of a lightweight ceramic proppant, an intermediate strength ceramic proppant, a high strength ceramic proppant, a natural frac sand, a porous ceramic proppant and glass beads.

27. The method according to any one of paragraphs 17 to 26, wherein the resin coating comprises an amine-cured novolac resin coating.

28. The method according to paragraph 27, wherein the amine-cured novolac resin comprises a hexamine-cured novolac resin.

29. The method according to paragraph 28, wherein the resin coating comprises residual active amine groups.

30. The method according to any one of paragraphs 17 to 29, wherein the resin coating comprises an epoxy resin coating.

31. The method according to any one of paragraphs 17 to 30, wherein the consolidation of at least of portion of the resin-coated proppant particulates takes place at a temperature of less than 200° F.

32. A method of hydraulic fracturing of a subterranean formation, the method comprising: mixing an activator, a thickener, a crosslinker, and a plurality of resin-coated proppant particulates to provide a fracturing fluid; contacting a subterranean formation with the fracturing fluid so as to create or enhance one or more fractures in the subterranean formation; depositing the plurality of resin-coated proppant particulates in at least one or more of the fractures; breaking the fracturing fluid; and consolidating at least a portion of the plurality of resin-coated proppant particulates to provide a consolidated proppant pack, wherein the consolidated proppant pack has a UCS of at least about 60 psi under a pressure of about 0.01 psi to about 50 psi and a temperature of about 160° F. to about 250° F.

33. The method according to paragraph 32, wherein the fracturing fluid is obtained by: providing an aqueous solution containing a breaker, the activator and the thickener; mixing the plurality of resin-coated proppant particulates with the aqueous solution to provide a slurry; and adding the crosslinker to the slurry to provide the fracturing fluid.

34. The method according to paragraph 32, wherein the fracturing fluid is obtained by: providing a slurry containing the plurality of resin-coated proppant particulates; mixing the activator with the slurry to provide an activated slurry; and adding the crosslinker to the activated slurry to provide the fracturing fluid.

35. The method according to paragraph 32, wherein the fracturing fluid is obtained by: providing an aqueous solution containing a breaker, the activator and the thickener; mixing the crosslinker with the aqueous solution to provide a base fluid; and adding the plurality of resin-coated proppant particulates to the base fluid to provide the fracturing fluid.

36. The method according to any one of paragraphs 32 to 36, wherein the activator is selected from the group consisting of D.E.R. 3913, D.E.R. 732, and D.E.R. 736 and any mixture thereof.

37. The method according to any one of paragraphs 32 to 36, wherein the thickener is selected from the group consisting of guar, guar gum, xanthan gum, locust bean gum, hydroxypropyl guar, carboxymethyl guar, carboxymethylhydroxypropyl guar, starches, polysaccharides, alginates, mineral oil, HEC, ethylcellulose, methylcellulose, sodium carboxymethylcellulose, hydroxypropylcellulose, and hydroxyethylcellulose, and polyacrylamides and any combination thereof.

38. The method according to any one of paragraphs 32 to 37, wherein the crosslinker comprises boron, zirconium, titanium, chromium, iron, or aluminum or any combination thereof.

39. The method according to any one of paragraphs 32 to 38, wherein the crosslinker is a delayed crosslinker.

40. The method according to any one of paragraphs 32 to 39, wherein the fracturing fluid further comprises a buffer that delays crosslinking of the thickener for about 30 seconds to about 5 minutes.

41. The method according to any one of paragraphs 32 to 40, wherein the proppant particulates are selected from the group consisting of a lightweight ceramic proppant, an intermediate strength ceramic proppant, a high strength ceramic proppant, a natural frac sand, a porous ceramic proppant and glass beads.

42. The method according to any one of paragraphs 32 to 41, wherein the crosslinker in the fracturing fluid increases the viscosity of the fracturing fluid.

43. The method according to any one of paragraphs 32 to 42, wherein the resin coating comprises an amine-cured novolac resin coating.

44. The method according to paragraph 43, wherein the amine-cured novolac resin comprises a hexamine-cured novolac resin.

45. The method according to any one of paragraphs 32 to 44, wherein the resin coating comprises residual active amine groups.

46. The method according to any one of paragraphs 32 to 45, wherein the resin coating comprises an epoxy resin coating.

47. The method according to any one of paragraphs 32 to 46, wherein the consolidation of at least of portion of the resin-coated proppant particulates takes place at a temperature of less than 200° F.

48. A ceramic proppant composition, comprising: a plurality of porous ceramic proppant particulates; an activator infused in the porous ceramic proppant particulates; and a resin coated onto outer surfaces of the porous ceramic proppant particulates.

49. The ceramic proppant composition according to paragraph 48, wherein the plurality of porous ceramic particulates have a porosity from about 1% to about 75%.

50. The ceramic proppant composition according to paragraphs 48 or 49, wherein the activator is selected from the group consisting of water dispersible liquid epoxy resin, a water dispersible solid epoxy resin, and an amine-rich resin and any mixture thereof.

51. The ceramic proppant composition according to any one of paragraphs 48 to 50, wherein the activator is selected from the group consisting of D.E.R. 3913, D.E.R. 732, and D.E.R. 736 and any mixture thereof.

52. The ceramic proppant composition according to any one of paragraphs 48 to 50, wherein the resin-coating comprises an amine-cured novolac resin coating.

53. The ceramic proppant composition according to paragraph 52, wherein the amine-cured novolac resin coating comprises a hexamine-cured novolac resin.

54. The ceramic proppant composition according to paragraph 53, wherein the resin coating comprises residual active amine groups.

55. The ceramic proppant composition according to any one of paragraphs 48 to 54, wherein the activator elutes from the porous ceramic proppant particulates at a rate of at least about 0.5 ppm/(gram*day).

56. The ceramic proppant composition according to paragraph 55, wherein the activator eluted from the porous ceramic proppant particulates has an affinity for the resin coating of the proppant particulates.

57. A method of gravel packing a wellbore, the method comprising: mixing a thickener, a crosslinker, and the ceramic proppant composition of claim 48 to provide a gravel pack fluid; introducing the gravel pack fluid into a gravel pack region of the wellbore; and consolidating at least a portion of the ceramic proppant composition to provide a consolidated gravel pack, wherein the consolidated gravel pack has a UCS of at least about 60 psi under a pressure of about 0.01 psi to about 50 psi and a temperature of about 160° F. to about 250° F.

58. The method according to paragraph 57, wherein the gravel pack fluid is obtained by: providing an aqueous solution containing a breaker and the thickener; mixing the ceramic proppant composition with the aqueous solution to provide a slurry; and adding the crosslinker to the slurry to provide the gravel pack fluid.

59. The method according to paragraph 57, wherein the gravel pack fluid is obtained by: providing a slurry containing the ceramic proppant composition; and adding the crosslinker to the slurry to provide the gravel pack fluid.

60. The method according to paragraph 57, wherein the gravel pack fluid is obtained by: providing an aqueous solution containing a breaker and the thickener; mixing the crosslinker with the aqueous solution to provide a base fluid; and adding the ceramic proppant composition to the base fluid to provide the gravel pack fluid.

61. The method according to any one of paragraphs 57 to 60, wherein the activator is selected from the group consisting of D.E.R. 3913, D.E.R. 732, and D.E.R. 736 and any mixture thereof.

62. The method according to any one of paragraphs 57 to 61, wherein the thickener is selected from the group consisting of guar, guar gum, xanthan gum, locust bean gum, hydroxypropyl guar, carboxymethyl guar, carboxymethylhydroxypropyl guar, starches, polysaccharides, alginates, HEC, ethylcellulose, methylcellulose, sodium carboxymethylcellulose, hydroxypropylcellulose, and hydroxyethylcellulose, and polyacrylamides and any combination thereof.

63. The method according to any one of paragraphs 57 to 62, wherein the crosslinker comprises boron, zirconium, titanium, chromium, iron, or aluminum or any combination thereof.

64. The method according to any one of paragraphs 57 to 63, wherein the crosslinker is a delayed crosslinker.

65. The method according to any one of paragraphs 57 to 64, wherein the gravel pack fluid further comprises a buffer that delays crosslinking of the thickener for about 30 seconds to about 5 minutes.

66. The method according to any one of paragraphs 57 to 65, wherein the crosslinker in the gravel pack fluid increases the viscosity of the gravel pack fluid.

67. The method according to any one of paragraphs 57 to 66, wherein the resin coating comprises an amine-cured novolac resin coating.

68. The method according to paragraph 67, wherein the amine-cured novolac resin comprises a hexamine-cured novolac resin.

69. The method according to paragraph 68, wherein the resin coating comprises residual active amine groups.

70. The method according to any one of paragraphs 57 to 69, wherein the resin coating comprises an epoxy resin coating.

71. The method according to any one of paragraphs 57 to 70, further comprising eluting the activator from the porous ceramic proppant particulates and onto the resin coating to cause the consolidation of the at least a portion of the ceramic proppant composition.

72. The method according to paragraph 71, wherein the activator elutes from the porous ceramic proppant particulates at a rate of at least about 0.5 ppm/(gram*day).

73. The method according to paragraph 72, wherein the activator eluted from the porous ceramic proppant particulates has an affinity for the resin coating.

74. The method according to paragraph 71, wherein the consolidation of at least of portion of the resin-coated proppant particulates takes place at a temperature of less than 200° F.

75. A method of frac packing a wellbore, the method comprising: mixing a thickener, a crosslinker, and the ceramic proppant composition of claim 48 to provide a frac pack fluid; introducing the frac pack fluid into a frac pack region of the wellbore and into a fracture of a subterranean formation adjacent to the frac pack region; and consolidating at least a portion of the ceramic proppant composition to provide a consolidated frac pack, wherein the consolidated frac pack has a UCS of at least about 60 psi under a pressure of about 0.01 psi to about 50 psi and a temperature of about 160° F. to about 250° F.

76. The method according to paragraph 75, wherein the frac pack fluid is obtained by: providing an aqueous solution containing a breaker and the thickener; mixing the ceramic proppant composition with the aqueous solution to provide a slurry; and adding the crosslinker to the slurry to provide the frac pack fluid.

77. The method according to paragraph 75, wherein the frac pack fluid is obtained by: providing a slurry containing the ceramic proppant composition; and adding the crosslinker to the slurry to provide the frac pack fluid.

78. The method according to paragraph 75, wherein the frac pack fluid is obtained by: providing an aqueous solution containing a breaker and the thickener; mixing the crosslinker with the aqueous solution to provide a base fluid; and adding the ceramic proppant composition to the base fluid to provide the frac pack fluid.

79. The method according to any one of paragraphs 75 to 78, wherein the activator is selected from the group consisting of D.E.R. 3913, D.E.R. 732, and D.E.R. 736 and any mixture thereof.

80. The method according to any one of paragraphs 75 to 79, wherein the thickener is selected from the group consisting of guar, guar gum, xanthan gum, locust bean gum, hydroxypropyl guar, carboxymethyl guar, carboxymethylhydroxypropyl guar, starches, polysaccharides, alginates, HEC, ethylcellulose, methylcellulose, sodium carboxymethylcellulose, hydroxypropylcellulose, and hydroxyethylcellulose, and polyacrylamides and any combination thereof.

81. The method according to any one of paragraphs 75 to 80, wherein the crosslinker comprises boron, zirconium, titanium, chromium, iron, or aluminum or any combination thereof.

82. The method according to any one of paragraphs 75 to 81, wherein the crosslinker is a delayed crosslinker.

83. The method according to any one of paragraphs 75 to 82, wherein the frac pack fluid further comprises a buffer that delays crosslinking of the thickener for about 30 seconds to about 5 minutes.

84. The method according to any one of paragraphs 75 to 83, wherein the resin coating comprises an amine-cured novolac resin coating.

85. The method according to any one of paragraphs 75 to 84, wherein the amine-cured novolac resin comprises a hexamine-cured novolac resin.

86. The method according to any one of paragraphs 75 to 85, wherein the resin coating comprises residual active amine groups.

87. The method according to any one of paragraphs 75 to 86, wherein the resin coating comprises an epoxy resin coating.

88. The method according to any one of paragraphs 75 to 87, further comprising eluting the activator from the porous ceramic proppant particulates and onto the resin coating to cause the consolidation of the at least a portion of the ceramic proppant composition.

89. The method according to paragraph 88, wherein the activator elutes from the porous ceramic proppant particulates at a rate of at least about 0.5 ppm/(gram*day).

90. The method according to paragraph 89, wherein the activator eluted from the porous ceramic proppant particulates has an affinity for the resin coating.

91. The method according to paragraph 88, wherein the consolidation of at least of portion of the resin-coated proppant particulates takes place at a temperature of less than 200° F.

92. A method of hydraulic fracturing of a subterranean formation, the method comprising: mixing a thickener, a crosslinker, and the ceramic proppant composition of claim 48 to provide a fracturing fluid; contacting a subterranean formation with the fracturing fluid so as to create or enhance one or more fractures in the subterranean formation; depositing the plurality of resin-coated proppant particulates in at least one or more of the fractures; breaking the fracturing fluid; and consolidating at least a portion of the ceramic proppant composition to provide a consolidated proppant pack, wherein the consolidated proppant pack has a UCS of at least about 60 psi under a pressure of about 0.01 psi to about 50 psi and a temperature of about 160° F. to about 250° F.

93. The method according to paragraph 92, wherein the fracturing fluid is obtained by: providing an aqueous solution containing a breaker and the thickener; mixing the ceramic proppant composition with the aqueous solution to provide a slurry; and adding the crosslinker to the slurry to provide the fracturing fluid.

94. The method according to paragraph 92, wherein the fracturing fluid is obtained by: providing a slurry containing the ceramic proppant composition; and adding the crosslinker to the slurry to provide the fracturing fluid.

95. The method according to paragraph 92, wherein the fracturing fluid is obtained by: providing an aqueous solution containing a breaker and the thickener; mixing the crosslinker with the aqueous solution to provide a base fluid; and adding the ceramic proppant composition to the base fluid to provide the fracturing fluid.

96. The method according to any one of paragraphs 92 to 95, wherein the activator is selected from the group consisting of D.E.R. 3913, D.E.R. 732, and D.E.R. 736 and any mixture thereof.

97. The method according to any one of paragraphs 92 to 96, wherein the thickener is selected from the group consisting of guar, guar gum, xanthan gum, locust bean gum, hydroxypropyl guar, carboxymethyl guar, carboxymethylhydroxypropyl guar, starches, polysaccharides, alginates, HEC, ethylcellulose, methylcellulose, sodium carboxymethylcellulose, hydroxypropylcellulose, and hydroxyethylcellulose, and polyacrylamides and any combination thereof.

98. The method according to any one of paragraphs 92 to 97, wherein the crosslinker comprises boron, zirconium, titanium, chromium, iron, or aluminum or any combination thereof.

99. The method according to any one of paragraphs 92 to 98, wherein the crosslinker is a delayed crosslinker.

100. The method according to any one of paragraphs 92 to 99, wherein the fracturing fluid further comprises a buffer that delays crosslinking of the thickener for about 30 seconds to about 5 minutes.

101. The method according to any one of paragraphs 92 to 100, wherein the proppant particulates are selected from the group consisting of a lightweight ceramic proppant, an intermediate strength ceramic proppant, a high strength ceramic proppant, a natural frac sand, a porous ceramic proppant and glass beads.

102. The method according to any one of paragraphs 92 to 101, wherein the crosslinker in the fracturing fluid increases the viscosity of the fracturing fluid.

103. The method according to any one of paragraphs 92 to 102, wherein the resin coating comprises an amine-cured novolac resin coating.

104. The method according to paragraph 103, wherein the amine-cured novolac resin comprises a hexamine-cured novolac resin.

105. The method according to paragraph 103, wherein the resin coating comprises residual active amine groups.

106. The method according to any one of paragraphs 92 to 105, wherein the resin coating comprises an epoxy resin coating.

107. The method according to any one of paragraphs 92 to 105, further comprising eluting the activator from the porous ceramic proppant particulates and onto the resin coating to cause the consolidation of the at least a portion of the ceramic proppant composition.

108. The method according to paragraph 107, wherein the activator elutes from the porous ceramic proppant particulates at a rate of at least about 0.5 ppm/(gram*day).

109. The method according to paragraph 108, wherein the activator eluted from the porous ceramic proppant particulates has an affinity for the resin coating.

110. The method according to paragraph 107, wherein the consolidation of at least of portion of the resin-coated proppant particulates takes place at a temperature of less than 200° F.

While the present invention has been described in terms of certain embodiments, those of ordinary skill in the art will recognize that the invention can be practiced with modification within the spirit and scope of the appended claims.

The present disclosure has been described relative to several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of hydraulically fracturing a subterranean formation, the method comprising:
mixing an activator, a thickener, and a plurality of resin-coated proppant particulates to provide an activated slurry, wherein the activator comprises an epoxy and the resin-coated proppant particulates each comprise a phenol-formaldehyde resin coating containing a plurality of active amine sites;
contacting the activator with the phenol-formaldehyde resin coating to initiate a reaction of the activator with the phenol-formaldehyde resin coating in the activated slurry;

adding a crosslinker to the activated slurry to provide a fracturing fluid;
introducing the fracturing fluid into an induced fracture located in the subterranean formation; and
consolidating at least a portion of the plurality of resin-coated proppant particulates to provide a consolidated proppant pack, wherein the consolidated proppant pack has a UCS of at about 60 psi to about 500 psi when formed under a pressure of about 0.01 psi to about 50 psi and a temperature of about 160° F. to about 250° F.

2. The method of claim 1, wherein the activated slurry is obtained by:
providing an aqueous solution containing, a breaker, the activator and the thickener; and
mixing the plurality of resin-coated proppant particulates with the aqueous solution to provide the activated slurry.

3. The method of claim 1, wherein the activated slurry is obtained by:
providing a slurry containing the plurality of resin-coated proppant particulates; and
mixing the activator and a breaker with the slurry to provide the activated slurry.

4. The method of claim 1, wherein at least a portion of the consolidated proppant pack forms a frac pack in a frac pack region of a wellbore adjacent to the induced fracture.

5. The method of claim 1, wherein the activator comprises one or more flexible epoxy resins, and the fracturing fluid has an activator concentration of about 0.1 wt % to about 10 wt %.

6. The method of claim 1, wherein the thickener is selected from the group consisting of guar, guar gum, xanthan gum, locust bean gum, hydroxypropyl guar, carboxymethyl guar, carboxymethylhydroxypropyl guar, starches, polysaccharides, alginates, HEC, ethylcellulose, methylcellulose, sodium carboxymethylcellulose, hydroxypropylcellulose, and hydroxyethylcellulose, and polyacrylamides and any combination thereof.

7. The method of claim 1, wherein the crosslinker comprises boron, zirconium, titanium, chromium, iron, or aluminum or any combination thereof.

8. The method of claim 1, wherein the crosslinker is a delayed crosslinker.

9. The method of claim 1, wherein the phenol-formaldehyde resin coating comprises an amine-cured novolac resin coating, wherein the amine-cured novolac resin coating has a curability of about 5 wt % to about 45 wt %.

10. The method of claim 9, wherein the amine-cured novolac resin comprises a hexamine-cured novolac resin.

11. The method of claim 10, wherein the plurality of active amine sites of the hexamine-cured novolac resin are residual active amine groups.

12. The method of claim 1, wherein the presence of the activator does not affect a viscosity of the fracturing fluid.

13. A method of hydraulic fracturing a subterranean formation, the method comprising:
mixing a thickener, a crosslinker, and a ceramic proppant composition to provide a fracturing fluid, wherein the ceramic proppant composition comprises:
a plurality of porous ceramic proppant particulates;
an activator infused into one or more pores of the porous ceramic proppant particulates; and
a resin coated onto outer surfaces of the porous ceramic proppant particulates;
introducing the fracturing fluid into the subterranean formation; and
consolidating at least a portion of the ceramic proppant composition to provide a consolidated proppant pack, wherein the consolidated proppant pack has a UCS of about 60 psi to about 500 psi when formed under a pressure of about 0.01 psi to about 50 psi and a temperature of about 160° F. to about 250° F.,
wherein the activator elutes from the porous ceramic proppant particulates at a rate of at least about 0.5 ppm/(gram*day) to about 500 ppm/(gram*day).

14. The method of claim 13, wherein the activator is selected from the group consisting of a water dispersible liquid epoxy resin, a water dispersible solid epoxy resin, and a flexible epoxy resin, and any mixture thereof and wherein the resin comprises an amine-cured novolac resin.

15. A method of gravel packing a wellbore, the method comprising:
mixing an aqueous solution, a delayed crosslinker, a breaker, an activator comprising an epoxy and a thickener to provide a base fluid; and
adding a plurality of resin-coated proppant particulates to the base fluid to provide the gravel pack fluid, wherein the resin-coated proppant particulates each comprise a phenol-formaldehyde resin coating containing a plurality of active amine sites;
contacting the epoxy with the active amine sites to initiate a reaction of the activator with the phenol-formaldehyde resin coating in the gravel pack fluid;
initiating crosslinking of the thickener to increase a viscosity of the gravel pack fluid;
introducing the gravel pack fluid into a gravel pack region of the wellbore; and
consolidating at least a portion of the plurality of resin-coated proppant particulates to provide a consolidated gravel pack, wherein the consolidated gravel pack has a UCS of about 60 psi to about 500 psi when formed under a pressure of about 0.01 psi to about 50 psi and a temperature of about 160° F. to about 250° F.

16. The method of claim 15, wherein the activator comprises one or more flexible epoxy resins.

17. The method of claim 15, wherein the thickener is selected from the group consisting of guar, guar gum, xanthan gum, locust bean gum, hydroxypropyl guar, carboxymethyl guar, carboxymethylhydroxypropyl guar, starches, polysaccharides, alginates, HEC, ethylcellulose, methylcellulose, sodium carboxymethylcellulose, hydroxypropylcellulose, and hydroxyethylcellulose, and polyacrylamides and any combination thereof.

18. The method of claim 15, wherein the delayed crosslinker comprises boron, zirconium, titanium, chromium, iron, or aluminum or any combination thereof.

19. The method of claim 15, wherein the phenol-formaldehyde resin coating comprises an amine-cured novolac resin coating, wherein the amine-cured novolac resin coating has a curability of about 5 wt % to about 45 wt %.

20. The method of claim 19, wherein the resin-coated proppant particulates are consolidated by bonding caused by the reaction of the activator with the phenol-formaldehyde resin coating.

* * * * *